(12) United States Patent
Zhang et al.

(10) Patent No.: US 11,023,832 B2
(45) Date of Patent: Jun. 1, 2021

(54) METHOD AND SYSTEM FOR TASK PROCESSING

(71) Applicant: Alibaba Group Holding Limited, Grand Cayman (KY)

(72) Inventors: Lili Zhang, Hangzhou (CN); Zhenhao Wu, Hangzhou (CN); Jintao Lu, Hangzhou (CN); Dengxian Lai, Hangzhou (CN); Bing Hu, Hangzhou (CN)

(73) Assignee: DINGTALK HOLDING (CAYMAN) LIMITED, Grand Cayman (KY)

( * ) Notice: Subject to any disclaimer, the term of this patent is extended or adjusted under 35 U.S.C. 154(b) by 762 days.

(21) Appl. No.: 15/469,248

(22) Filed: Mar. 24, 2017

(65) Prior Publication Data

US 2017/0330120 A1    Nov. 16, 2017

(30) Foreign Application Priority Data

May 13, 2016 (CN) .......................... 201610320179.8

(51) Int. Cl.
*G06Q 10/06* (2012.01)
*G06Q 10/10* (2012.01)

(52) U.S. Cl.
CPC ..... *G06Q 10/06311* (2013.01); *G06Q 10/109* (2013.01)

(58) Field of Classification Search
CPC ........... G06Q 10/06311; G06Q 10/109; G06Q 10/1093
See application file for complete search history.

(56) References Cited

U.S. PATENT DOCUMENTS

| 6,424,711 | B1 | 7/2002 | Bayless |
| 7,035,923 | B1 | 4/2006 | Yoakum |
| 7,133,687 | B1 | 11/2006 | El-Fishawy |
| 7,159,191 | B2 | 1/2007 | Koivuniemi |

(Continued)

FOREIGN PATENT DOCUMENTS

| CN | 101094233 | 12/2007 |
| CN | 103632332 | 3/2014 |

(Continued)

OTHER PUBLICATIONS

"Managing Activities with TVACTA: TaskVista and Activity-Centered Task Assistant", V Bellotti, JD Thornton—Proc. SIGIR Workshop on PIM, 2006—academia.edu (Year: 2006).*

(Continued)

*Primary Examiner* — Jonathan G Sterrett
(74) *Attorney, Agent, or Firm* — Shun Yao; Park, Vaughan, Fleming & Dowler LLP

(57) ABSTRACT

Embodiments of the present application provide a method and system for task processing. During operation, the system may receive a task event generated by a task sending device with an initial state of the task event being a to-be-accepted state. The system may perform a first reminding operation associated with the task event for a user. Upon receiving a predetermined user response, the system may change the state of the task event from the to-be-accepted state to an activated state, wherein the predetermined user response is responsive to the first reminding operation associated with the task event.

20 Claims, 35 Drawing Sheets

(56) References Cited

U.S. PATENT DOCUMENTS

| | | | |
|---|---|---|---|
| 7,197,122 B2 | 3/2007 | Vuori | |
| 7,398,252 B2 | 7/2008 | Neofytides | |
| 7,603,413 B1 | 10/2009 | Herold | |
| 7,653,691 B2 | 1/2010 | Lasensky | |
| 7,669,134 B1 | 2/2010 | Christie | |
| 7,835,955 B1 | 11/2010 | Brodsky | |
| 8,165,609 B2 | 4/2012 | Fang | |
| 8,316,096 B2 | 11/2012 | Svendsen | |
| 8,352,341 B1* | 1/2013 | Greenberg | G06Q 10/06311 705/35 |
| 8,355,699 B1 | 1/2013 | Lo | |
| 8,548,865 B1 | 10/2013 | Ho | |
| 8,670,791 B2 | 3/2014 | Ye | |
| 8,768,310 B1 | 7/2014 | Oroskar | |
| 8,769,022 B2 | 7/2014 | Tivyan | |
| 8,788,602 B1 | 7/2014 | Wan | |
| 8,843,117 B2 | 9/2014 | Sigmund | |
| 8,856,244 B2 | 10/2014 | Madnani | |
| 8,880,725 B2 | 11/2014 | Ananthanarayanan | |
| 8,929,871 B2* | 1/2015 | Bradburn | H04M 3/42127 455/412.2 |
| 8,968,103 B2 | 3/2015 | Zhou | |
| 9,021,040 B1 | 4/2015 | Andrews | |
| 9,117,197 B1 | 8/2015 | Sharma | |
| 9,143,477 B2 | 9/2015 | Murthy | |
| 9,185,062 B1 | 11/2015 | Yang | |
| 9,230,244 B2 | 1/2016 | Patil | |
| 9,253,639 B1 | 2/2016 | Lafuente | |
| 9,578,160 B2 | 2/2017 | Kim | |
| 9,800,525 B1 | 10/2017 | Lerner | |
| 10,021,203 B2 | 7/2018 | Papakipos | |
| 10,200,332 B2 | 2/2019 | Wu et al. | |
| 10,417,037 B2* | 9/2019 | Gruber | G06F 9/4843 |
| 2002/0016163 A1 | 2/2002 | Burgan | |
| 2002/0120453 A1 | 8/2002 | Lee | |
| 2003/0084109 A1 | 5/2003 | Balluff | |
| 2003/0135559 A1 | 7/2003 | Bellotti | |
| 2003/0154249 A1 | 8/2003 | Crockett | |
| 2004/0002932 A1 | 1/2004 | Horvitz | |
| 2004/0006599 A1 | 1/2004 | Bates | |
| 2004/0085360 A1 | 5/2004 | Pratt | |
| 2004/0102962 A1 | 5/2004 | Wei | |
| 2005/0149855 A1 | 7/2005 | Loo | |
| 2005/0177368 A1 | 8/2005 | Odinak | |
| 2006/0093142 A1 | 5/2006 | Schneier | |
| 2006/0229890 A1 | 10/2006 | Sattler | |
| 2007/0060193 A1 | 3/2007 | Kim | |
| 2007/0105572 A1 | 5/2007 | Kim | |
| 2007/0123223 A1 | 5/2007 | Letourneau | |
| 2007/0299565 A1 | 12/2007 | Oesterling | |
| 2008/0112596 A1 | 5/2008 | Rhoads | |
| 2008/0114776 A1 | 5/2008 | Sun | |
| 2008/0168361 A1 | 7/2008 | Forstall | |
| 2008/0168379 A1 | 7/2008 | Forstall | |
| 2008/0209417 A1* | 8/2008 | Jakobson | G06F 9/4856 718/100 |
| 2008/0307040 A1 | 12/2008 | So | |
| 2008/0307094 A1 | 12/2008 | Karonen | |
| 2009/0018903 A1 | 1/2009 | Iyer | |
| 2009/0240497 A1 | 9/2009 | Usher | |
| 2009/0287776 A1 | 11/2009 | Corry | |
| 2010/0004971 A1* | 1/2010 | Lee | G06Q 10/06311 705/7.13 |
| 2010/0005402 A1 | 1/2010 | George | |
| 2010/0017481 A1 | 1/2010 | Chen | |
| 2010/0023341 A1 | 1/2010 | Ledbetter | |
| 2010/0056109 A1 | 3/2010 | Wilson | |
| 2010/0105362 A1 | 4/2010 | Yang | |
| 2010/0205541 A1 | 8/2010 | Rapaport | |
| 2010/0216448 A1 | 8/2010 | Jeon | |
| 2010/0323752 A1 | 12/2010 | Park | |
| 2011/0019662 A1 | 1/2011 | Katis | |
| 2011/0035687 A1 | 2/2011 | Katis | |
| 2011/0136431 A1 | 6/2011 | Haaramo | |
| 2011/0145823 A1* | 6/2011 | Rowe | G06Q 10/109 718/100 |
| 2011/0173041 A1 | 7/2011 | Breitenbach | |
| 2011/0173548 A1 | 7/2011 | Madnani | |
| 2011/0243113 A1 | 10/2011 | Hjelm | |
| 2011/0313803 A1* | 12/2011 | Friend | G06Q 10/06311 705/7.13 |
| 2011/0314402 A1* | 12/2011 | Kikin-Gil | G06Q 10/109 715/772 |
| 2012/0030301 A1 | 2/2012 | Herold | |
| 2012/0046077 A1 | 2/2012 | Kim | |
| 2012/0059842 A1 | 3/2012 | Hille-Doering | |
| 2012/0108268 A1* | 5/2012 | Lau | H04L 51/14 455/456.3 |
| 2012/0185547 A1 | 7/2012 | Hugg | |
| 2012/0290950 A1* | 11/2012 | Rapaport | H04L 51/32 715/753 |
| 2012/0311585 A1* | 12/2012 | Gruber | H04W 4/16 718/100 |
| 2013/0080580 A1 | 3/2013 | Nagai | |
| 2013/0086071 A1 | 4/2013 | Riedel | |
| 2013/0133055 A1 | 5/2013 | Ali | |
| 2013/0138726 A1 | 5/2013 | Shin | |
| 2013/0144702 A1 | 6/2013 | Tabor | |
| 2013/0173723 A1 | 7/2013 | Herold | |
| 2013/0227029 A1 | 8/2013 | Hymel | |
| 2013/0227041 A1 | 8/2013 | Rideout | |
| 2013/0268418 A1 | 10/2013 | Sardi | |
| 2013/0268765 A1 | 10/2013 | Kent, Jr. | |
| 2013/0275164 A1* | 10/2013 | Gruber | G10L 17/22 705/5 |
| 2013/0297493 A1 | 11/2013 | Linden | |
| 2013/0298006 A1 | 11/2013 | Good | |
| 2013/0311920 A1 | 11/2013 | Koo | |
| 2013/0332162 A1 | 12/2013 | Keen | |
| 2013/0332307 A1 | 12/2013 | Linden | |
| 2014/0025546 A1 | 1/2014 | Seng | |
| 2014/0035956 A1* | 2/2014 | Hay | G06F 3/0488 345/672 |
| 2014/0070945 A1* | 3/2014 | Dave | G08B 21/24 340/540 |
| 2014/0074483 A1* | 3/2014 | van Os | G10L 15/22 704/275 |
| 2014/0101263 A1 | 4/2014 | Wu | |
| 2014/0164073 A1 | 6/2014 | Mosley | |
| 2014/0191986 A1 | 7/2014 | Kim | |
| 2014/0207659 A1 | 7/2014 | Erez | |
| 2014/0213318 A1 | 7/2014 | Leem | |
| 2014/0279315 A1 | 9/2014 | Courter | |
| 2014/0280615 A1 | 9/2014 | Burlin | |
| 2014/0297348 A1* | 10/2014 | Ellis | G06Q 10/063114 705/7.15 |
| 2014/0331150 A1 | 11/2014 | Griffin | |
| 2014/0372516 A1 | 12/2014 | Watte | |
| 2015/0039708 A1 | 2/2015 | Liu | |
| 2015/0081486 A1 | 3/2015 | Niazi | |
| 2015/0135046 A1* | 5/2015 | Moore | G06Q 10/06311 715/202 |
| 2015/0170104 A1 | 6/2015 | Yamada | |
| 2015/0207926 A1 | 7/2015 | Brown | |
| 2015/0256353 A1 | 9/2015 | Busey | |
| 2015/0264303 A1 | 9/2015 | Chastney | |
| 2015/0296450 A1 | 10/2015 | Koo | |
| 2015/0310567 A1 | 10/2015 | Wu | |
| 2015/0317590 A1* | 11/2015 | Karlson | G06Q 10/06316 705/7.21 |
| 2015/0346821 A1 | 12/2015 | Ichimura | |
| 2015/0350130 A1 | 12/2015 | Yang | |
| 2015/0350225 A1 | 12/2015 | Perold | |
| 2016/0055215 A1 | 2/2016 | Kauwe | |
| 2016/0062574 A1 | 3/2016 | Anzures | |
| 2016/0094509 A1 | 3/2016 | Ye | |
| 2016/0125363 A1 | 5/2016 | Hung | |
| 2016/0132971 A1 | 5/2016 | Teh | |
| 2016/0227019 A1 | 8/2016 | Seol | |
| 2016/0242007 A1 | 8/2016 | Mihara | |
| 2016/0330163 A1 | 11/2016 | Le Gall | |
| 2017/0041255 A1 | 2/2017 | Dong | |

(56) References Cited

U.S. PATENT DOCUMENTS

| | | | |
|---|---|---|---|
| 2017/0118147 A1 | 4/2017 | Dold | |
| 2017/0142212 A1 | 5/2017 | Bifulco | |
| 2017/0171135 A1 | 6/2017 | Wu | |
| 2017/0185930 A1* | 6/2017 | Perry | G06Q 10/06312 |
| 2017/0185965 A1 | 6/2017 | Nishizawa | |
| 2017/0228699 A1 | 8/2017 | Pang | |
| 2018/0088784 A1 | 3/2018 | Zhu | |
| 2019/0012527 A1 | 1/2019 | Wang | |
| 2019/0014070 A1* | 1/2019 | Mertvetsov | H04L 51/046 |

FOREIGN PATENT DOCUMENTS

| | | |
|---|---|---|
| CN | 105282328 | 1/2016 |
| CN | 105306600 | 2/2016 |
| JP | 2011059811 | 3/2011 |
| JP | 2011517380 | 6/2011 |
| JP | 2014106592 | 6/2014 |
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016050146 | 4/2016 |
| WO | 2016054629 | 4/2016 |
| WO | 2016054629 A1 | 4/2016 |

OTHER PUBLICATIONS

"Towel: Towards an Intelligent To-Do List.", K Conley, J Carpenter—AAAI Spring Symposium: Interaction Challenges for . . . , 2007—aaai.org (Year: 2007).*

An Adaptive, Emotional, and Expressive Reminding System. N Richard, S Yamada—AAAI Spring Symposium: Interaction Challenges for . . . , 2007—aaai.org (Year: 2007).*

Gwynee, Guilford, "WeChat's little red envelopes are brilliant marketing for mobile payments," published on the internet at https://qz.com, on Jan. 29, 2014 (Year: 2014).

Anonymous, "Crowdsource Your Company's Bonuses," I Done This Blog, www.blog.idonethis.com, May 30, 2012 (Year:2012).

Hao Yunhong, Qian Chen, "Decentralization and Compensation Reforms in China: The Case of Xiaoshan InterTrade," 2008 ISECS International Colloquium on Computing, Communication, Control and Management, IEEE Computer Society (Year: 2008).

Ozimec et al., "Moticational Inventives for developing salesforce performance in emerging markets," University of Zagreb, Croatia, IEEE (Year: 2011).

* cited by examiner

GROUP CHAT MESSAGE
SESSION WINDOW OF TASK
SENDING DEVICE

FUNCTION MENU OF TASK
SENDING DEVICE

TASK MANAGEMENT PAGE
OF A TASK SENDING DEVICE

MESSAGE LIST PAGE ON
TASK RECEIVING DEVICE

TASK DISPLAY PAGE OF
TASK RECEIVING DEVICE

TASK DISPLAY PAGE OF
TASK SENDING DEVICE

TASK DISPLAY PAGE OF
TASK RECEIVING DEVICE

TASK RECEIVING DEVICE REQUESTING
SECOND TASK COMPLETION CONFIRMATION

MESSAGE DISPLAY PAGE OF
TASK RECEIVING DEVICE

TASK DISPLAY PAGE OF
TASK RECEIVING DEVICE

TASK DISPLAY PAGE OF
TASK RECEIVING DEVICE

TASK DISPLAY PAGE OF
TASK SENDING DEVICE

TASK DISPLAY PAGE OF
TASK RECEIVING DEVICE

TASK DISPLAY PAGE OF
TASK RECEIVING DEVICE

TASK DISPLAY PAGE OF
TASK SENDING DEVICE

TASK DISPLAY PAGE OF
TASK RECEIVING DEVICE

DISPLAY OF ALL REMINDER MESSAGES

CATEGORY OPTIONS MENU

DISPLAY OF ALL
TASK-TYPE REMINDER MESSAGES

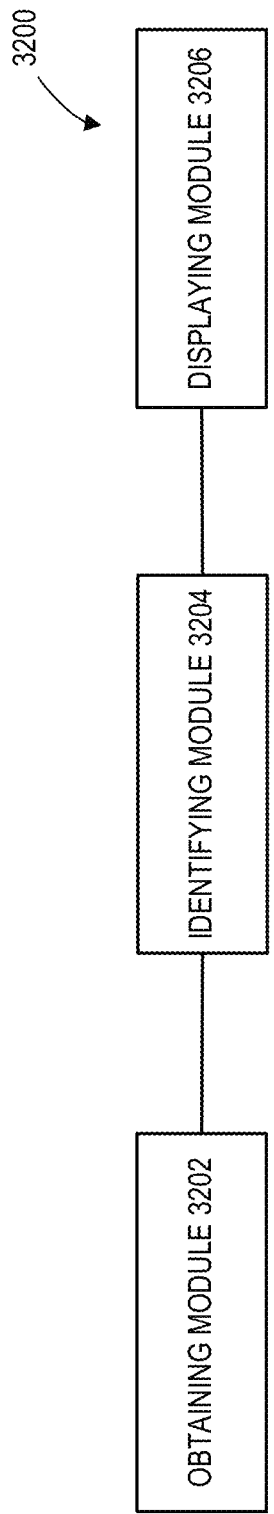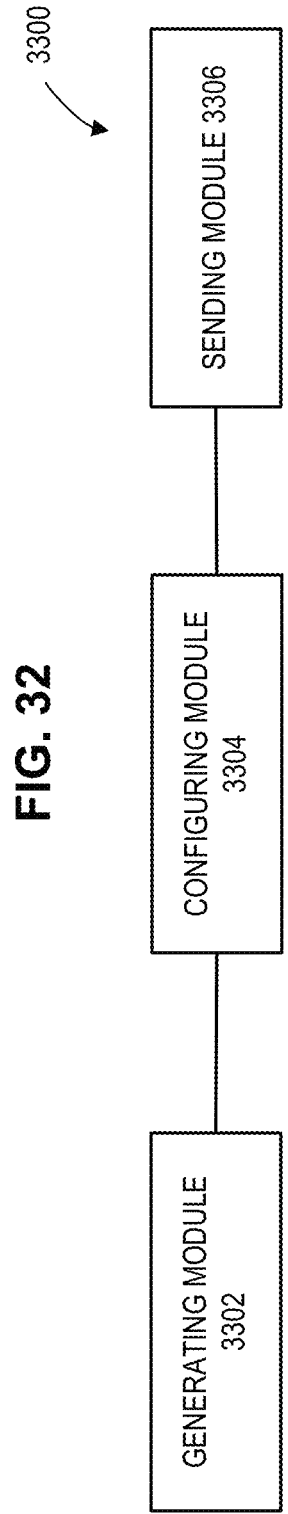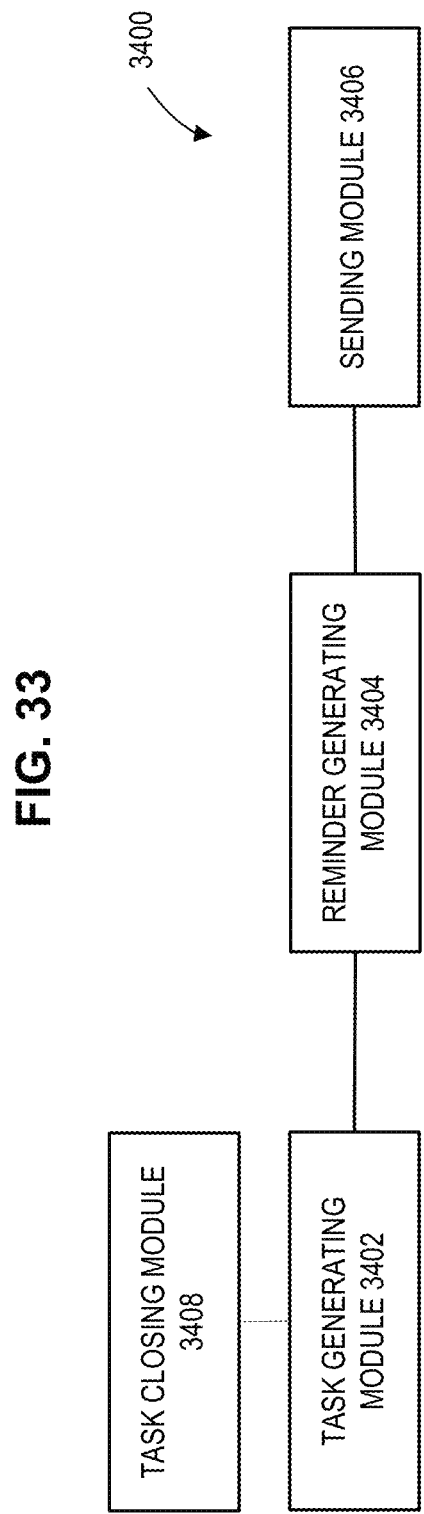
FIG. 32
FIG. 33
FIG. 34

METHOD AND SYSTEM FOR TASK PROCESSING

RELATED APPLICATION

Under 35 U.S.C. 119, this application claims the benefits and rights of priority of Chinese Patent Application No. 201610320179.8, filed 13 May 2016.

BACKGROUND

Field

The present disclosure relates to the technology of task processing, and particularly relates to a method and system for task processing.

Related Art

In mobile work or learning scenarios, a user may assign work or learning content to other users in the form of tasks. The recipients of these tasks may process these tasks which are assigned to them, including determining the task requirements and task deadline. The task recipient may also receive reminders of the task deadline, thereby helping the task recipient avoid delay and complete the task on time.

SUMMARY

One embodiment of the present disclosure provides a system for task processing. During operation, the system may receive a task event generated by a task sending device with an initial state of the task event being a to-be-accepted state. Upon detecting a predetermined user response, the system may change the state of the task event from the to-be-accepted state to an activated state, in which the predetermined user response is responsive to a first reminding operation associated with the task event.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which:

FIG. 32 presents a schematic diagram illustrating an exemplary task processing device, in accordance with an embodiment of the present invention.

FIG. 33 presents a schematic diagram illustrating an exemplary task processing device, in accordance with an embodiment of the present invention.

FIG. 34 presents a schematic diagram illustrating an exemplary task processing device, in accordance with an embodiment of the present invention.

DETAILED DESCRIPTION OF EMBODIMENTS

Embodiments of the present invention solve the problem of improving task processing by allowing a task receiving party (e.g., a mobile device user) to decide whether to accept a task event sent from a task sending party. When the task receiving party accepts the task event, a task receiving device operated by the task receiving party may change the state of the task event from to-be-accepted to accepted. The task receiving party may notify the task sending party that the state of the task event has changed. The task receiving device may remind the user of the task event.

When the task receiving device receives input from the user indicating that the user has completed the task event, the task receiving device may send a message reporting the task event has been completed to the task sending device. The task sending party may then approve or reject the reported task completion. If the reported task completion is approved, the task receiving device may change the state of the task event to a completed state. If the reported task completion is rejected, the task receiving device may change the state of the task event to an activated state.

Drawbacks Associated with Related Technologies

Mobile work or learning may involve assigning to users tasks that include work or learning content. However, the assignment of tasks in such related technologies exhibits the following drawbacks:

1. Existing systems only take into account the needs of the task sending party when assigning tasks. The recipient of the task may only accept an assigned task and is unable to choose whether to accept or decline the task based on circumstances.

2. Existing systems by default accept the task for the recipient. However, the recipient might in fact not have seen the task due to various reasons, which may cause delay in processing the task.

3. Due to the recipient's lack of knowledge of the task assignment, the task sender and the task recipient may need to make phone calls, send messages, and/or use other means of communication to confirm the task assignment. Therefore, existing systems lack an effective, quick feedback mechanism with respect to the status of task acceptance.

Accordingly, the present disclosure proposes a new solution for task processing to address the problems with existing technologies discussed above.

Exemplary Computing System for Task Processing

Figure 1:
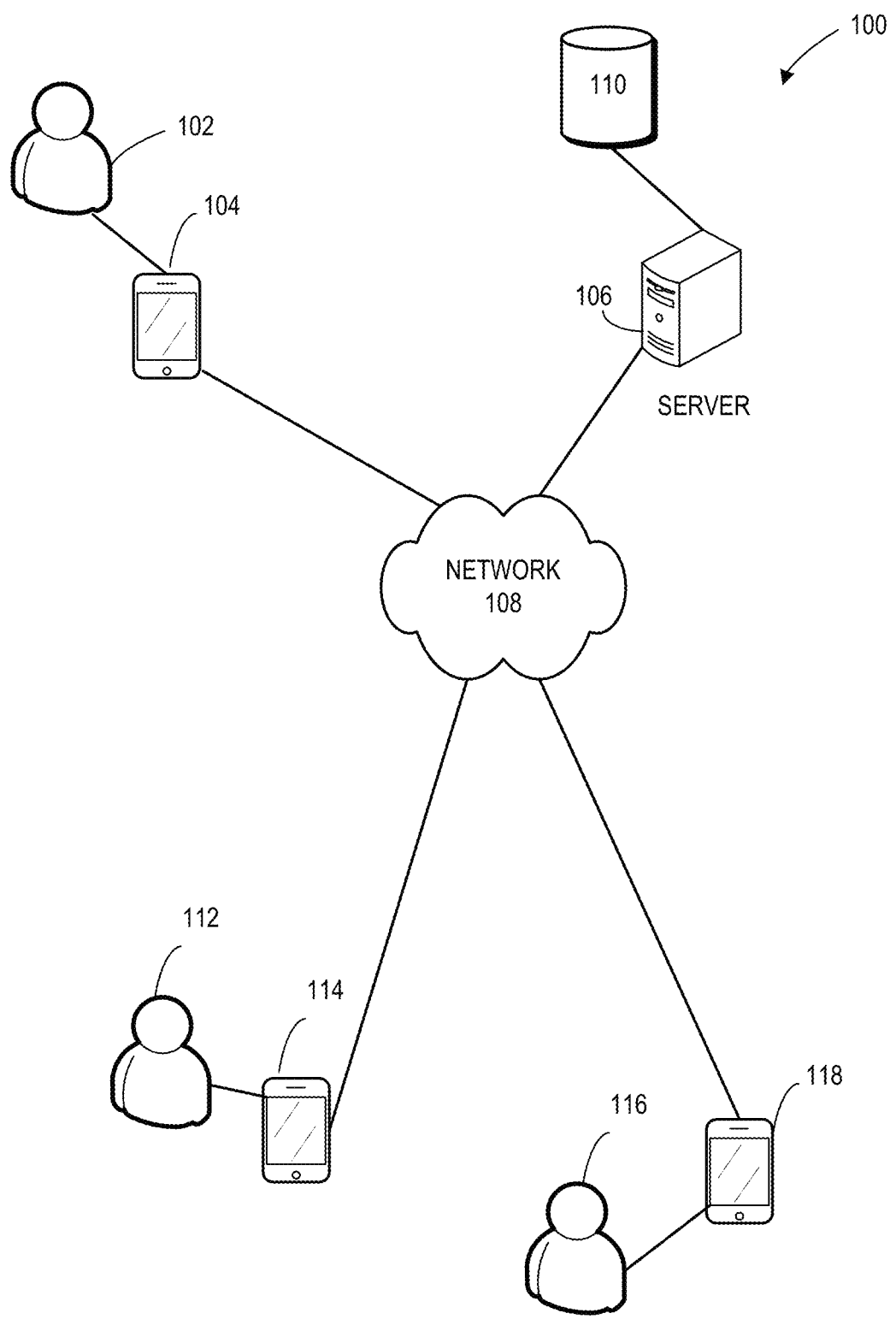
FIG. 1 presents a diagram illustrating an exemplary computing system for task processing, in accordance with an embodiment of the present invention.

FIG. 1 presents a diagram illustrating an exemplary computing system 100 for task processing, in accordance with an embodiment of the present invention. As illustrated in FIG. 1, a user 102 may be operating a computing device 104 with installed modules that allows user 102 to participate in instant messaging, view Internet webpages, initiate voice/video phone calls, share files, and receive e-mails and inquiries. User 102 may also operate computing device 104 to send and receive task events. Computing device 104 may be a mobile device such as a mobile phone, a tablet, a laptop, a desktop computer, or any other type of computing device. User 102 may represent, for example, a user associated with an organization. Computing device 104 may communicate with a server 106 over a network 108. Server 106 may represent a server that performs operations associated with processing task events. For example, the server may send reminder instructions to task receiving devices. Server 106 may include a storage 110 for storing code for various applications and other data, such as code for instant messaging software (including task processing management modules) and user and message data. Storage 110 may also store code for the modules described herein, such as a task generating module which generates a task event based on user-configured task content and a deadline specified by the user. Note that server 106 may represent a cluster of machines supporting functions of the task processing server.

User 112 may operate a client 114, and user 116 may operate a client 118. For example, user 112 may operate client 114 to connect to server 106 and assign and receive task events. User 112 can also use client 114 to conduct instant messaging with other parties, such as user 102. Note that each of clients 114, 116 may be a mobile device such as a mobile phone, a tablet, a laptop, a desktop computer, or any other type of computing device.

In some embodiments, a client can send a request for customized executable code that when installed allows for instant messaging and/or task processing and/or interacting with server 106. The client can receive the executable code from server 106 and then install the executable code to enable instant messaging, task processing, and other user interaction with server 106. Further, server 106 can automatically update the executable code.

Note that the techniques discussed in the present disclosure represent an improvement in various technology areas such as human-machine interaction, user interfaces, and digital communications.

Figure 2:
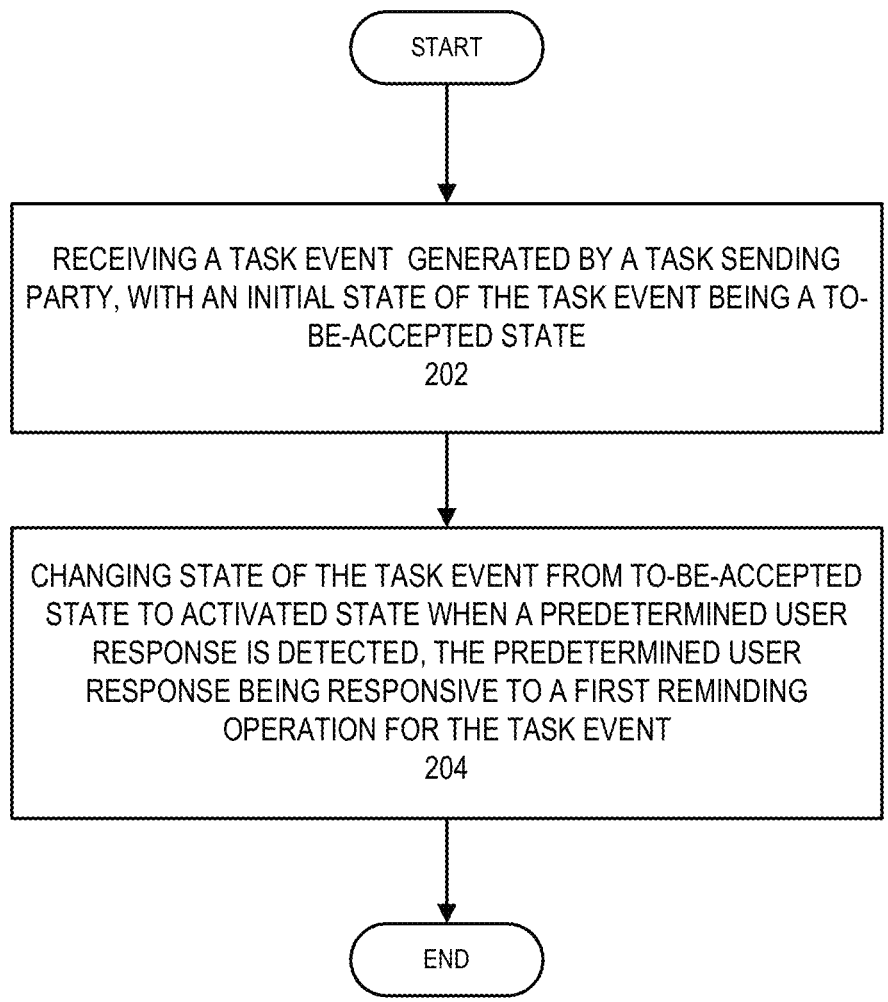
FIG. 2 presents a flowchart illustrating an exemplary process for task processing, in accordance with an embodiment of the present invention.

FIG. 2 presents a flowchart illustrating an exemplary process for task processing, in accordance with an embodiment of the present invention. An electronic device operated by a task recipient may perform the operations of FIG. 2. These operations are described below.

The task receiving device may receive a task event generated by a task sending party, with the initial state of the task event being a to-be-accepted state (operation 202).

The system may change the state of the task from the to-be-accepted state to an activated state when a predetermined user response is detected at the task receiving device. The predetermined user response may be responsive to a first reminding operation for the task event (operation 204). When a task event is initialized and/or generated based on a reminder message and a predetermined reminder type configured by a task sending party, the system may perform the first reminder operation according to the predetermined reminder type. For example, the system may remind the user within an application, or the system may remind the user by sending a message or making a phone call. Note that embodiments of the present invention are not limited to the exemplary reminder types.

An instant messaging application may generate and send the reminder message. For example, an enterprise instant messaging application such as DingTalk may generate and send the reminder message. Embodiments of the present application are not limited to any exemplary applications. By detecting an operation performed by a user for a task event, the system may determine whether the user wants to accept the task event. The system may change the state of the task event based on the operation performed by the user, so that the user may choose to accept and complete the task event or decline the task event. This avoids compelling the user to accept the task event, and provides the user with more choices and improves the flexibility of task assignments.

Figure 3:
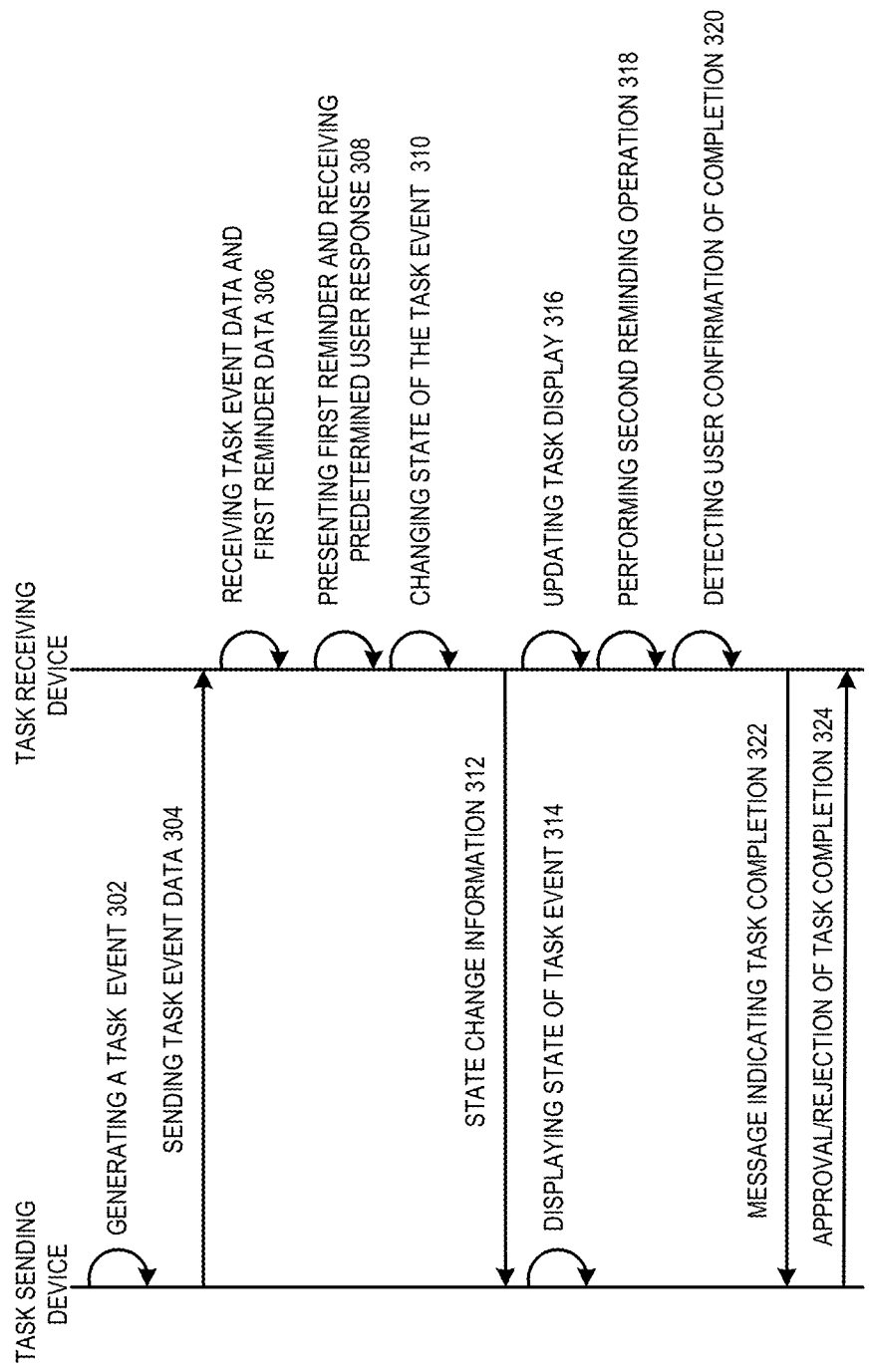
FIG. 3 presents a flowchart illustrating another exemplary process for task processing, in accordance with an embodiment of the present invention.

FIG. 3 presents a flowchart illustrating another exemplary process for task processing, in accordance with an embodiment of the present invention. As illustrated in FIG. 3, the method may include the operations described below. These operations may be performed by a task sending party and a task receiving party using an enterprise instant messaging application such as DingTalk.

A task sending party operating a task sending device may initially generate a task event using the task sending device (operation 302). The task sending device may then send task event information to the task receiving device (operation 304). The task receiving device associated with the task recipient may receive the task event information, and receive first reminder data associated with a first reminding operation (operation 306). The task receiving device may present a first reminder to a user and receive predetermined user response (e.g., user input) from the task recipient (operation 308).

The task receiving device may then change the state of the task event from to-be-accepted to activated (operation 310). The task receiving device may send state change information to the task sending device (operation 312). The task sending device may then display the state of the task event (operation 314). The task receiving device may update the task display (operation 316).

The task receiving device may perform a second reminding operation to remind the task recipient (operation 318). The task receiving device may detect user confirmation of completion (operation 320). The task receiving device may receive user input confirming completion. In some embodiments, the task receiving device may automatically detect user completion of a task event or may receive a message or signal sent from other software (or other source) that a task event has been completed.

The task receiving device may then send to the task sending device a message indicating that the task has been completed (operation 322). The task sending device may return to the task receiving device a message approving or rejecting the reported task completion (operation 324). These operations of FIG. 3 are described in greater detail.

Initially, a task sending party may generate a task event using a task sending device (operation 302). The task sending device may be an electronic device used by the task sending party. Similarly, the task receiving device may be an electronic device used by a task recipient. Such electronic devices may be, for example, a mobile phone, a tablet computer, a personal computer, cars, or wearable device such as watches, glasses, rings and so on. Embodiments of the present invention are not limited to the disclosed devices.

By installing the enterprise instant messaging application client, e.g., DingTalk, the system may use the electronic devices to implement operations such as generating, releasing, and processing task events using the functional pages of DingTalk. The system may generate each functional page according to local data on the client device. The system may also generate a functional page based on online data, such as a HTML5 page.

Figure 4:
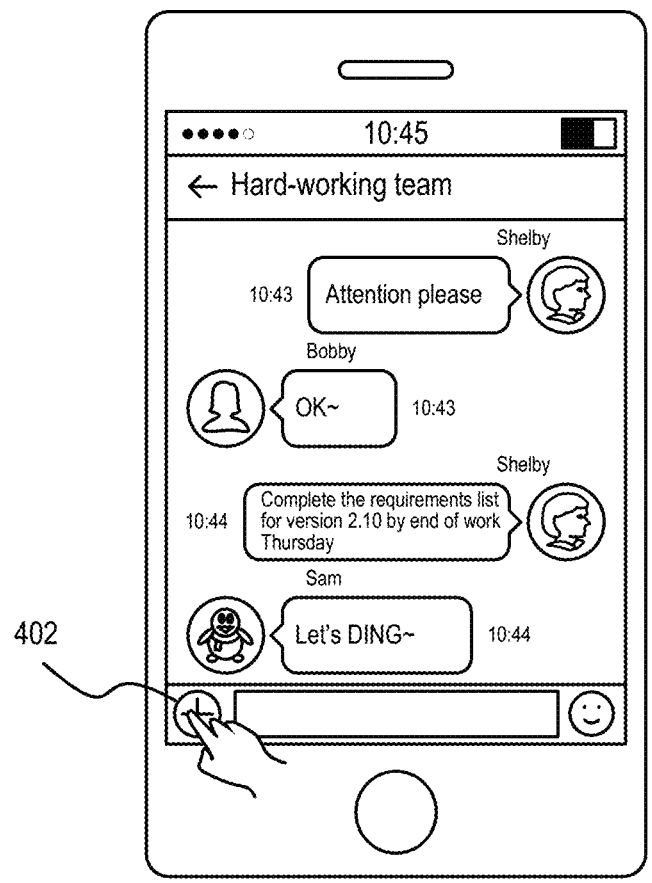
FIG. 4 presents a schematic diagram illustrating an exemplary group chat message session window on a task sending device, in accordance with an embodiment of the present invention.

FIG. 4 presents a schematic diagram illustrating an exemplary group chat message session window on a task sending device, in accordance with an embodiment of the present invention. The group chat message session window is for a group called "Hard-working team." When the system detects that a task sending party clicks on a "(+)" icon 402, which may be located at the bottom left corner of the group chat window (or another location), the system may activate the function menu shown in FIG. 5.

Figure 5:
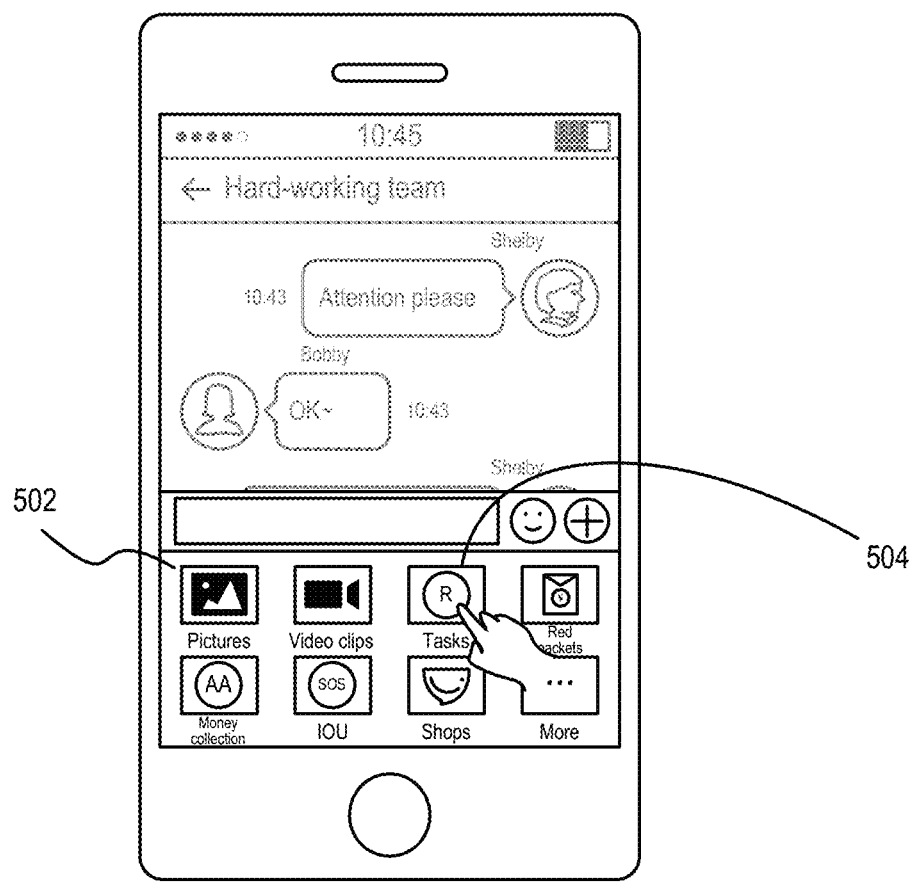
FIG. 5 presents a schematic diagram illustrating an exemplary function menu of a task sending device, accordance with an embodiment of the present invention.

FIG. 5 presents a schematic diagram illustrating an exemplary function menu 502 of a task sending device, in accordance with an embodiment of the present invention. Function menu 502 shown in FIG. 5 may include various function options such as "pictures," "video clips," and "tasks." When the system detects a click operation performed by the task sending party on a "tasks" function menu item 504, the system may determine that the user intends to create a task event, and the system may change the page to the task management page as shown in FIG. 6.

Figure 6:
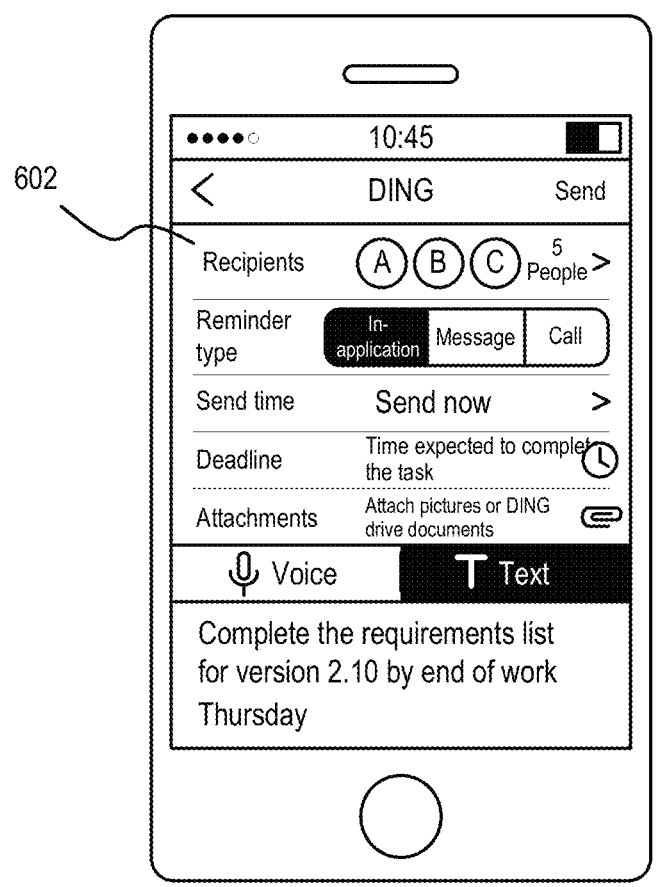
FIG. 6 presents a schematic diagram illustrating an exemplary task management page of a task sending device, in accordance with an embodiment of the present invention.

FIG. 6 presents a schematic diagram illustrating an exemplary task management page of a task sending device, in accordance with an embodiment of the present invention. As illustrated in FIG. 6, the task management page allows the user to view and edit the details of the displayed task. The task information 602 that is displayed may include, for example, recipients, reminder type, send time, deadline, attachments, whether the task is described using voice or text, and the task description.

Figure 7:
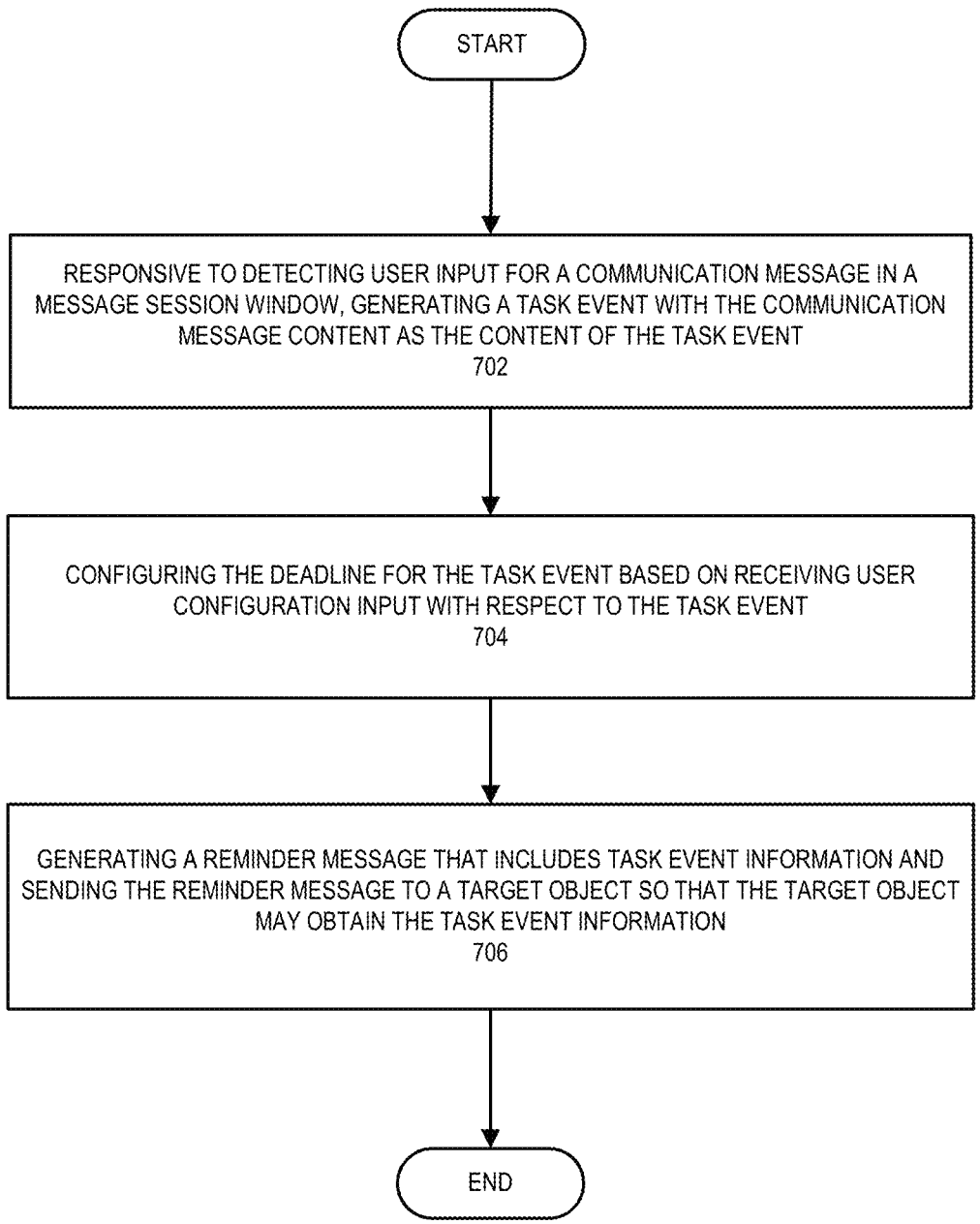
FIG. 7 presents a flowchart illustrating another exemplary process for generating a task event, in accordance with an embodiment of the present invention.

Besides the process illustrated above with respect to FIG. 4-FIG. 6, this disclosure also provides another method for generating a task event, as illustrated and discussed with respect to FIG. 7.

FIG. 7 presents a flowchart illustrating another exemplary process for generating a task event, in accordance with an embodiment of the present invention. As illustrated in FIG. 7, the method may include the following operations:

When the system detects user input for a communication message in a message session window, the system may generate a task event with the contents of the communication message as the content of the task event (operation 702).

The system may configure the deadline for the task event based on receiving user configuration input with respect to the task event (operation 704).

The system may generate a reminder message that includes the task event information, and send the reminder message to a target object (e.g., task receiving device). The target object may thereby obtain the task event information through the reminder (operation 706). These operations of FIG. 7 are described in greater detail below.

When the system detects user input for a communication message in a message session window, the system may generate a task event with the content of the communication message as the content of the task event (operation 702).

Figure 8A:
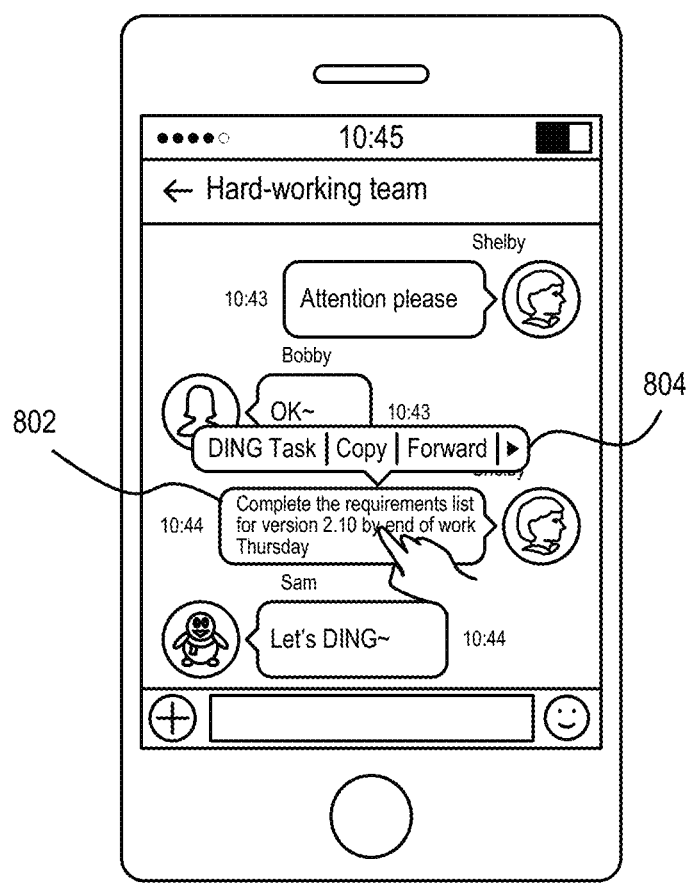
FIG. 8A presents a schematic diagram illustrating an exemplary display of operation options such as "DING Task," "Copy," and "Forward," in accordance with an embodiment of the present invention.

FIG. 8A presents a schematic diagram illustrating an exemplary display of operation options such as "DING Task," "Copy," and "Forward," in accordance with an embodiment of the present invention. As shown in FIG. 8A, when the system detects user input, such as a user clicking or touching and holding on a communication message 802, the system may display operation options 804 such as "DING Task," "Copy," and "Forward." When the system detects that the user selects "DING Task," the system may generate a respective task event by changing to the task management page as shown in FIG. 6. The content of the task event is the content of the communication message, i.e., the message "Complete the requirements list for version 2.10 by end of work Thursday" sent out by user "Shelby," and there is no need for the user to edit it manually.

The system may configure the deadline for the task event based on receiving user configuration input with respect to the task event (operation 704).

The deadline for a task event is the latest date allowed to complete the task that is set for a task recipient (or for the task event) by a task sending party. That is, the task recipient should complete the task event before the deadline. When detecting user input for the task deadline from the task sending user, the system may display a configuration menu as illustrated in FIG. 8B.

Figure 8B:
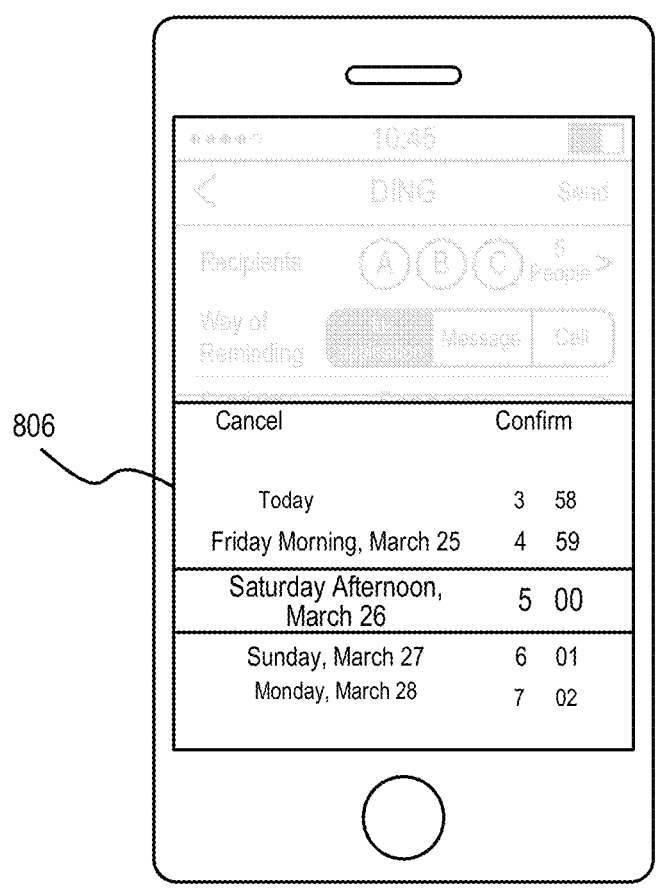
FIG. 8B presents a schematic diagram illustrating an exemplary display of a menu for configuring a deadline, in accordance with an embodiment of the present invention.

FIG. 8B presents a schematic diagram illustrating an exemplary display of a menu 806 for configuring a deadline, in accordance with an embodiment of the present invention. The system may configure the deadline for a task event based on detected user configuration input. For example, the task deadline configured in FIG. 8B is "5:00 pm, Saturday, March 26." The task management page illustrated in FIG. 6 may include a default task deadline, such as "within three days," or "within a week." If the default task deadline meets the requirement of the user, further user configuration input may be unnecessary.

The system may generate a reminder message that includes the task event information, and send the reminder message to a target object (e.g., a task receiving device) so that the target object may obtain the task event information (operation 706). The task event information may include the deadline and the content of the communication message.

The system may generate the task event and the reminder message based on user input received in a message session window and/or a task management window. The system may, as illustrated in the task management page illustrative in FIG. 6, automatically add users that the task sending user communicates with. For example, the system may add users from the message session window, such as Bobby and Sam, as the recipients of the reminder message. There is no need for the user to add recipients manually, but the user may choose to configure the reminder message recipient list. For example, as illustrated in FIG. 6, the system may designate A, B, and C, along with two other people, as the recipients. Additionally, although a group chat window of a "Hardworking team" is presented as an example, the embodiments of the present invention may also include a one-to-one chat window, in which case the other party to the communication is a single user. In this scenario, the system may add the single user as a recipient.

In the embodiment described above, a task management page is described in which the configuration page of a DING message provided by DingTalk (e.g., as illustrated in FIG. 6) is presented as an example. A DING message is a reminder message provided by DingTalk. When the deadline in the task management page is a default value, and the task sending user does not configure the deadline, the task management page illustrated in FIG. 6 may generate a reminder message provided by DingTalk. When the user configures the deadline, e.g., a task deadline is included, the task management page illustrated in FIG. 6 may generate a reminder message that includes the task event, or a DING message having the task attribute.

The task sending device may send the task event data to the task receiving device (operation 304).

In an embodiment, the task event may be initiated by a reminder message (e.g., a DING message) configured by the task sending party. That is, the task sending device sends the recipient a reminder message that includes the task event. For example, the task event may be "Complete the requirements list for version 2.10 by the end of work Thursday, "the deadline of the task is 5:00 pm, Saturday, March 26," and so forth.

The task sending party may configure the reminder type associated with the reminder message, so that the task recipient may receive using the task receiving device a first reminder associated with a first reminding operation, and the first reminder is of the reminder type configured by the task sending party.

Figure 9:
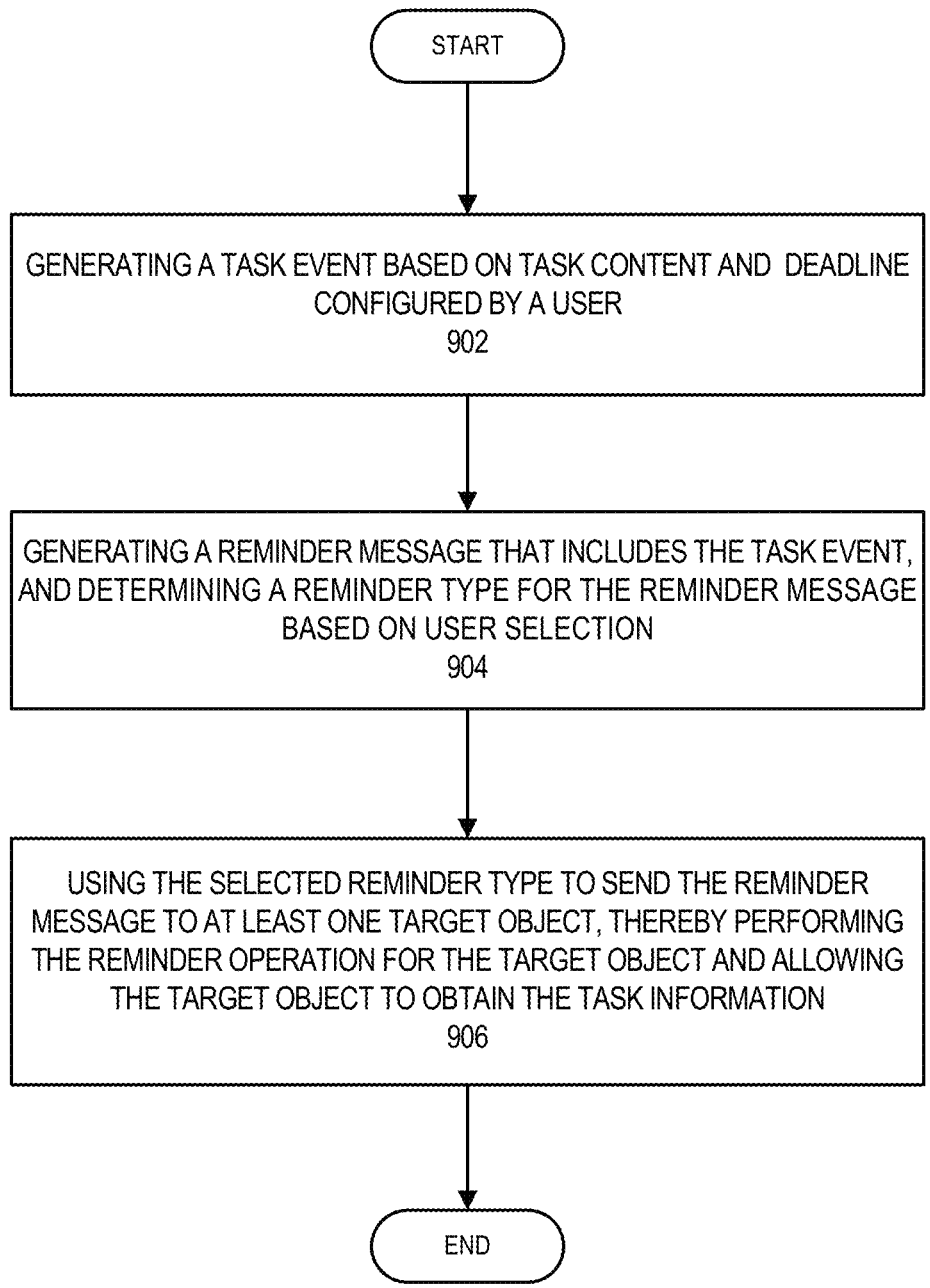
FIG. 9 presents a flowchart illustrating another exemplary task processing method, in accordance with an embodiment of the present invention.

FIG. 9 is a flow chart of another task processing method provided in an exemplary embodiment of the present application. As shown in FIG. 9, the method can be applied alone in an electronic device of a task sending party (e.g., a task sending device), and can also be applied in an electronic device of the task sending party based on any of the embodiments described above.

The system may generate a task event based on user-configured task content and a deadline also configured by the user (e.g., a task sending party) (operation 902).

The system may generate a reminder message that includes the task event, and determine a reminder type for the reminder message based on user input selecting the reminder type (operation 904).

The system may use the selected reminder type to send the reminder message to at least one target object (e.g., a task receiving device), thereby performing the reminder operation for the target object and allowing the target object to obtain the task information (operation 906).

The task sending party can select a reminder type according to circumstances. The task recipient may then respond based on the reminder type. For example, the task sending party may select an in-application reminder type to remind the task recipient with low impact. Alternatively, the task sending party may select a message reminder type to remind the task recipient with greater impact. The task sending party may also select a call reminder type to remind the task recipient with much greater effect. The various ways for implementing reminders discussed above and the respective responses taken by the task recipient are described in detail below.

The task receiving device may receive the task event, and also receive the first reminder associated with a first reminding operation (operation 306). The task receiving device may present the first reminder and receive the predetermined user response from the task recipient (operation 308). The task receiving device may change the state of the task event from to-be-accepted to activated (operation 310).

The task receiving device may receive the task event information, which includes obtaining task information such as the content of the task event and the deadline of the task event. The system may determine whether the user intends to accept the task event based on receiving and presenting the first reminder to the user, and receiving user input corresponding to the predetermined user response performed by the task recipient. This avoids compelling a task recipient to accept a task assignment, resulting in greater freedom in task management.

In the task management page as shown in FIG. 6, when the task event is sent in a reminder message (e.g., a DING message) configured by the task sending party based on a predetermined reminder type, the system may present the first reminder according to the predetermined reminder type.

For example, as shown in FIG. 6, when the task sending party configures the reminder type as in-application, the task receiving device may receive a reminder message and detect the task event. The system may use the reminding method included with DingTalk to implement the first reminding operation for the reminder message.

Figure 10:
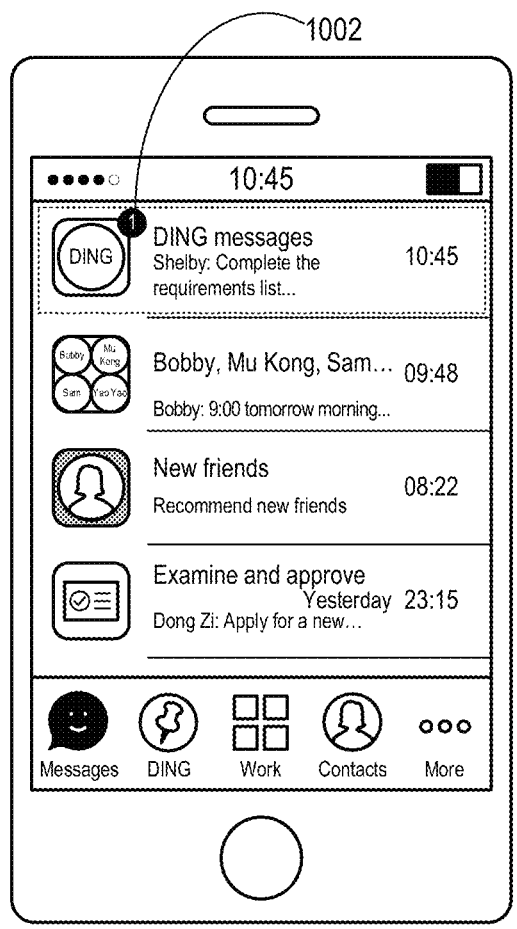
FIG. 10 presents a schematic diagram illustrating an exemplary message list page, in accordance with an embodiment of the present invention.

FIG. 10 presents a schematic diagram illustrating an exemplary message list page on a task receiving device, in accordance with an embodiment of the present invention. On the exemplary message list page as shown in FIG. 10, at a predetermined position (e.g., the upper right corner of the icon 1002) of the page entry area corresponding to the task display page (e.g., the rectangular area in dashed form as shown in FIG. 10), a visual indicator "①" is displayed. This visual indicator indicates that there is an unread reminder message. The task receiving device has received the respective task event associated with this reminder message, and the task event is in a to-be-accepted state. When the system detects a click operation performed by the task recipient on the page entry area, the system may display the task display page as shown in FIG. 11.

Figure 11:
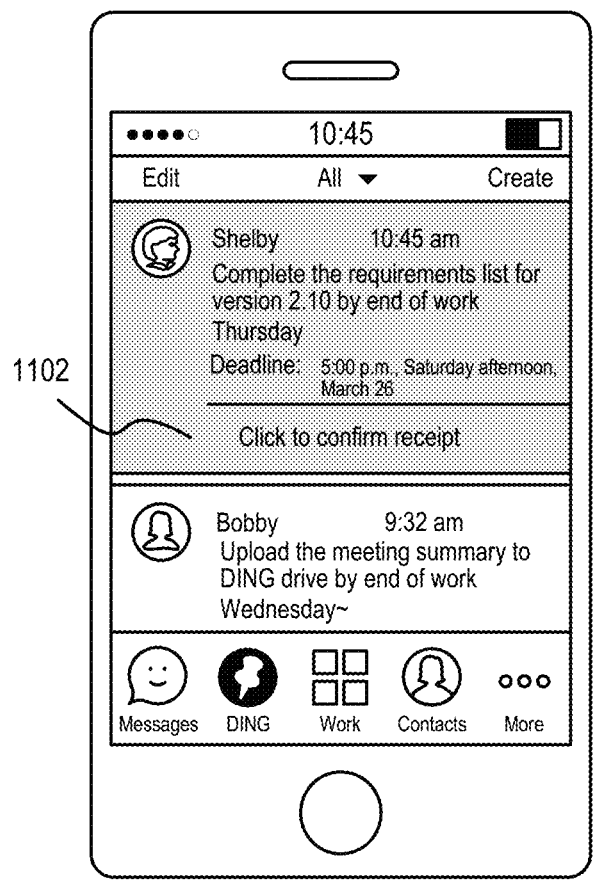
FIG. 11 presents a schematic diagram illustrating an exemplary task display page on a task receiving device, in accordance with an embodiment of the present invention.

FIG. 11 presents a schematic diagram illustrating an exemplary task display page of a task receiving device, in accordance with an embodiment of the present invention. As shown in FIG. 11, when the task is in a to-be-accepted state, the system displays a "click to confirm receipt" button 1102 at a location under the display area of the task event. When the system detects that the user clicks on "click to confirm receipt" button 1102, the system may determine that a predetermined user response for the first reminder is detected.

When the system determines that the task sending party configures the reminder type as a short message, the task receiving device may receive a reminder message and obtain the task event information. The task receiving device may present a reminder based on the short message. The content of the short message may be information associated with the task, such as the content of the task, the deadline of the task, and so forth. The reminding function provided by a short message is generally superior to that of an application (e.g., DingTalk), the reminding impact of a short message is greater than that of an application (e.g., DingTalk), and the predetermined priority of a short message reminder is higher than that of an in-application reminder.

When the task receiving device detects the task recipient performing a look-up operation for the message, the system may determine that a predetermined user response corresponding to the first reminder is detected. Also, when the task recipient replies with predetermined content to the short message, the system may determine that a predetermined user response corresponding to the first reminder is detected.

When the system determines that the task sending party configures the reminder type as call, the task receiving device may receive a reminder message and detect the task event. The task receiving device may implement the first reminder with an incoming call, such as ringing, vibrating, and so forth. The reminding function of a call is generally superior to that of the short message and in-application reminders, and the reminding impact of a call is greater than the short message and in-application reminders. The predetermined priority of a call reminder is higher than that of the short message and in-application reminders. When the task receiving device detects an answering operation for the incoming call performed by the task recipient, the task receiving device may determine that a predetermined user response corresponding to the first reminding operation is detected. The incoming call may voice broadcast task-related information, such as the content of the task, the deadline of the task, and so forth. Also, when the task receiving device detects the task recipient answering the incoming call, and confirms that the task-related information voice broadcast in the incoming call is heard completely by the task recipient (for example, not hanging up until the voice broadcast comes to an end), the system may determine that a predetermined user response corresponding to the first reminding operation is detected.

Additionally, based on the reminder type configured by a task sending party, the first reminding operation detected by a task receiving device may have different corresponding reminder impact level. For example, in-application reminders have a relatively low reminder impact level for a first reminding operation. The short message reminder type provides a higher reminder impact level for the first reminding operation. The call reminder type provides a much higher reminder impact level for the first reminding operation. The task sending party may freely select an appropriate reminder type according to the reminder impact level required in different scenarios.

The task receiving device may send state change information to the task sending device (operation 312).

The task sending device may then display the state of the task event (operation 314).

When the state of the task event changes from a to-be-accepted state to an activated state, the system may return related state change information to the task sending party, so that the task sending party may be informed of the task acceptance.

Figure 12:
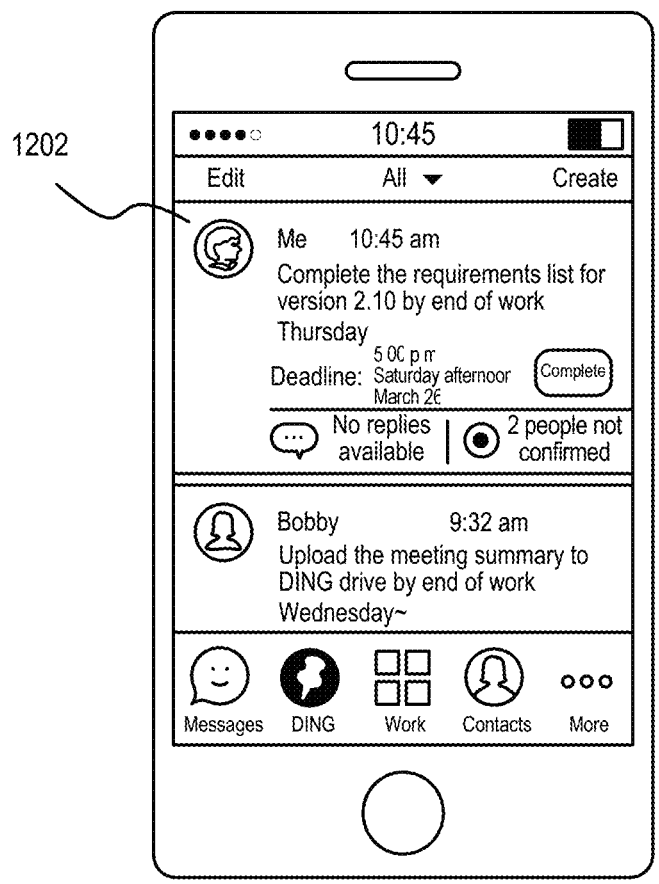
FIG. 12 presents a schematic diagram illustrating an exemplary task display page on a task sending device, in accordance with an embodiment of the present invention.

FIG. 12 presents a schematic diagram illustrating an exemplary task display page on a task sending device, in accordance with an embodiment of the present invention. FIG. 12 illustrates a task display page 1202 on the task sending device in which the state of the task event may be displayed with information such as "2 people not confirmed." With respect to FIG. 6, which displays 5 recipients, "2 people not confirmed" means that three people have accepted the task event while two people have not yet accepted the task event. The task sending party can check the acceptance status details by clicking on "2 people not confirmed." By returning the state change information to the task sending party and displaying the corresponding state of task events on the task sending device, the task sending party may learn the status of task acceptance for task recipients. The task sending party may timely learn the state of acceptance of the task event for each task recipient. The task sending party may directly determine the state of acceptance of a task event for each task recipient without needing to perform additional inquiries such as making phone calls, thereby addressing the problem of complexity in existing technology.

The recipient device may update the task display (operation 316).

The task receiving device may use a corresponding display method to display content associated with the task event based on the state of the task event. For example, on the task display page as illustrated in FIG. 11, when the task event is in the to-be-accepted state, the system displays a distinguishing background color to enhance the display section for content associated with the task event.

Figure 13:
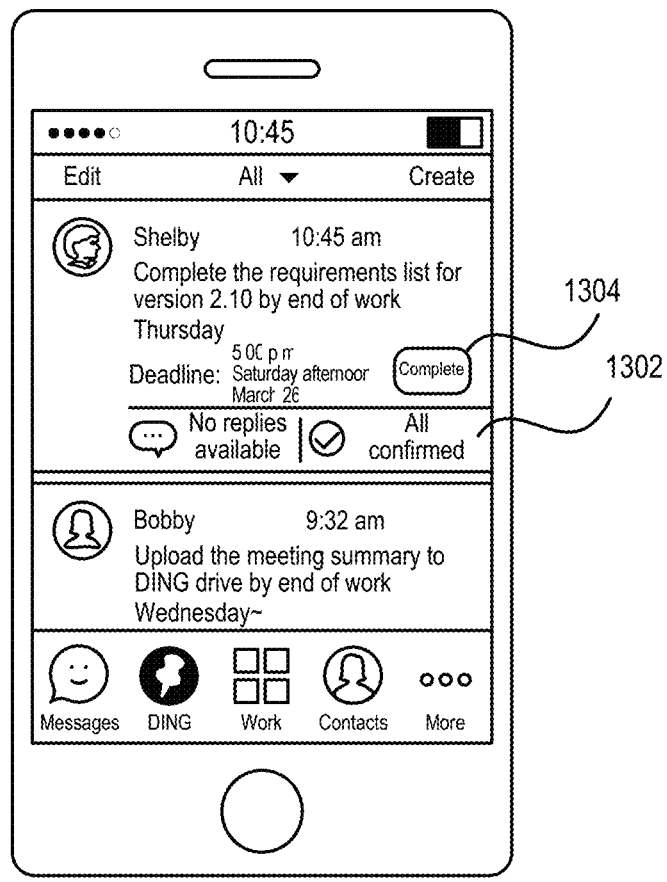
FIG. 13 presents a schematic diagram illustrating an exemplary task display page when the task event is in the activated state, in accordance with an embodiment of the present invention.

FIG. 13 presents a schematic diagram illustrating an exemplary task display page of the task receiving device when the task event is in the activated state, in accordance with an embodiment of the present invention. On the task display page as illustrated in FIG. 13, when the task event is in the activated state, the enhanced display of the background color is removed, thereby helping the task recipient to be highly efficient in managing the task event.

Additionally, on the task display page of the task receiving device as illustrated in FIG. 13, the task event display section may include a displayed visual indicator " all confirmed" 1302, which indicates that the task event has been accepted by all of the task recipients. Also, the system may update the displayed text "⊙2 people not confirmed" as illustrated in FIG. 12 to the updated text " all confirmed" as illustrated in FIG. 13.

By displaying the state of acceptance of the task event by the task recipients, each task recipient may learn the overall progress of the task event. This facilitates the smooth execution of the task event, especially in scenarios involving team work.

In some scenarios, each task recipient may only see his/her own state of acceptance of the task event, and only the task sending party may see the state of acceptance for all of the task recipients. This allows each task recipient to focus on his/her own work, and the task sending party may retain overall control in executing the task event.

On the task display page of the task receiving device, for the task event initiated by the task sending party "Shelby," the display section may also include a button labeled with displayed text "complete" 1304. When the task receiving device detects a click operation on the button labeled with displayed text "complete" 1304 performed by the task recipient, the task receiving device may determine the task recipient has confirmed completion of the task. The task receiving device may report the task completion to the task sending device, as further discussed below.

The task receiving device may perform a second reminding operation (operation 318).

The task receiving device may obtain information indicating a predetermined reminder cycle for the task event. The task receiving device may perform a second reminding operation for the task event according to the predetermined reminding cycle before marking the task as in a completed state. The predetermined reminding cycle may be a default cycle, or the task sending party (or other party) may configure a predetermined reminding cycle. The task receiving device may perform the second reminding operation using the notification capabilities of a client computing device. For example, the predetermined reminder cycle may be at 10 am every morning, and the task receiving device may perform the second reminding operation at 10 am every morning by ringing, vibrating, and so forth. The task receiving device may also use an in-application reminder to perform the second reminding operation.

The task receiving device may perform the second reminding operation associated with the task in response to a reminding instruction sent by a server. The server may send the reminding instruction according to a predetermined reminding cycle for the task event. The task receiving device may receive the reminding instruction sent by the server according to the predetermined reminding cycle. For example, the task receiving device may receive an instruction to perform a ringing operation that is pushed by the server at 10 am every morning. The task receiving device may ring accordingly, thereby implementing the second reminding operation for the task recipient.

In summary, with the task processing solution of the present disclosure, a task recipient may determine whether to accept the task event. This eliminates the problem of compelled acceptance in the existing technology, and allows for greater freedom in task assignments. When the task recipient returns the state change information of the task to the task sending party, the task sending party may timely learn the state of acceptance of the task for each task recipient, without the need to perform further inquiries by making phone calls or sending messages. This addresses the problem of the task sending party's lack of knowledge regarding task acceptance status and the complexity in existing technology.

The task receiving device may detect user activity confirming completion by the user (operation 320).

The task receiving device may send to the task sending device a message indicating that the task has been completed (operation 322).

The task sending device may return to the task receiving device a message approving or rejecting the reported task completion (operation 324).

In some embodiments, operation 324 is not a necessary operation. When operation 324 is not included, the task receiving device may mark the state of the respective task event as completed after the task receiving device sends to the task sending device a message indicating completion of the task. There is no need to wait for a verification or confirmation message from the task sending party.

Figure 14:
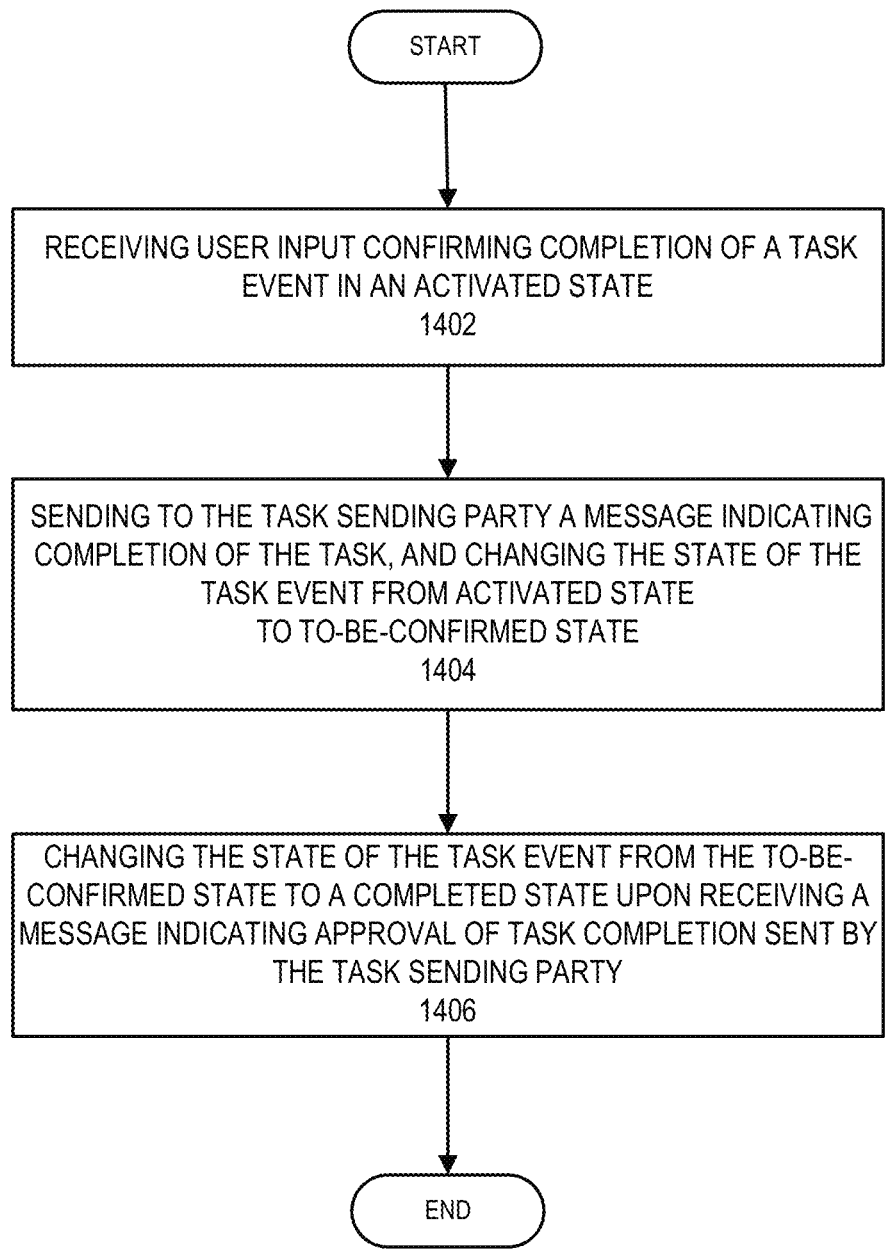
FIG. 14 presents a flowchart illustrating another exemplary task processing method, in accordance with an embodiment of the present invention.

FIG. 14 presents a flowchart illustrating another exemplary task processing method, in accordance with an embodiment of the present invention. FIG. 14 illustrates a method that includes operation 324 from FIG. 3, e.g., a task receiving device waits for confirmation from the task sending device before marking a task event as completed. The system may apply the method by itself (e.g., without regards to operations 302-318 in some embodiments) in a task receiving device. The system may also use the method in a task receiving device with any of the above embodiments (e.g., using the method with operations 302-324). In particular, the method may include the following operations:

The task receiving device may receive user input confirming completion of a task event in an activated state (operation 1402).

The task receiving device may send to the task sending party a message indicating completion of the task, and change the state of the task event from the activated state to a to-be-confirmed state (operation 1404).

The task receiving device may change the state of the task event from the to-be-confirmed state to a completed state upon receiving a message indicating approval of task completion sent by the task sending party (operation 1406).

The task sending party may examine the task recipient's completion of the task event, and approve of the task completion when the examination is successful (e.g., the task completion exceeds a requisite predetermined threshold). The task receiving device may change the state of the task event from the to-be-confirmed state to the activated state upon receiving a message from the task sending party rejecting the reported completion of the task. The task sending party may urge the task recipient to continue to process or work on the task event after determining that the task event does not pass the examination.

The task recipient may initiate action to confirm with the task sending party that the respective task event has been completed. For example, as illustrated in FIG. 13, on the task display page of the task receiving device, for the task event initiated by the task sending party "Shelby," a display section includes a button labeled with displayed text "complete" 1304. When the task receiving device detects a click operation on the button labeled with displayed text "complete" 1304 performed by the task recipient, the task receiving device may determine the task recipient has confirmed completion of the task.

Figure 15:
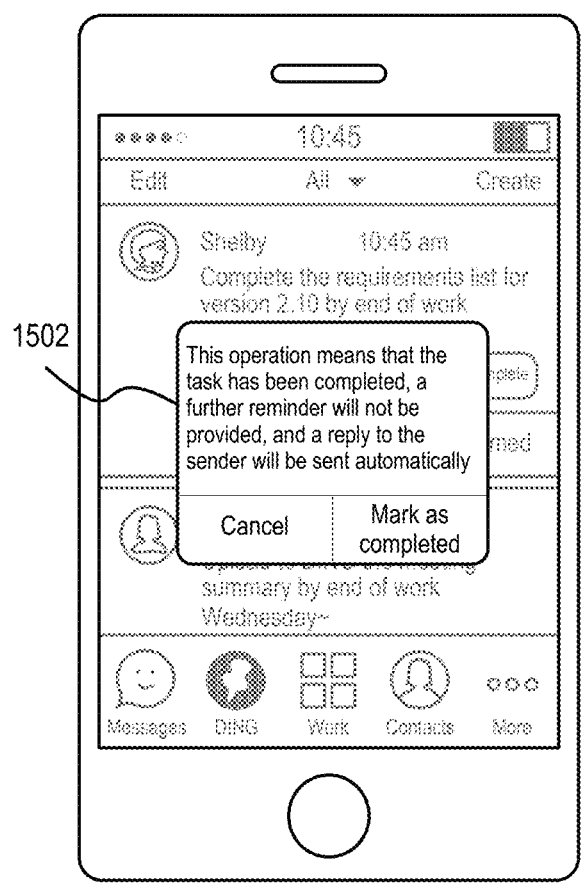
FIG. 15 presents a schematic diagram illustrating the task receiving device displaying a window requesting a second task completion confirmation, in accordance with an embodiment of the present invention.

FIG. 15 presents a schematic diagram illustrating the task receiving device displaying a window requesting a second task completion confirmation, in accordance with an embodiment of the present invention. To avoid confusion, as illustrated in FIG. 15, the system may request the user perform a second confirmation operation. For example, the system may display a floating window 1502 as illustrated in FIG. 15, and the system may receive confirmation that the user has completed the task when the displayed text "mark as completed" in the floating window is selected.

Figure 16:
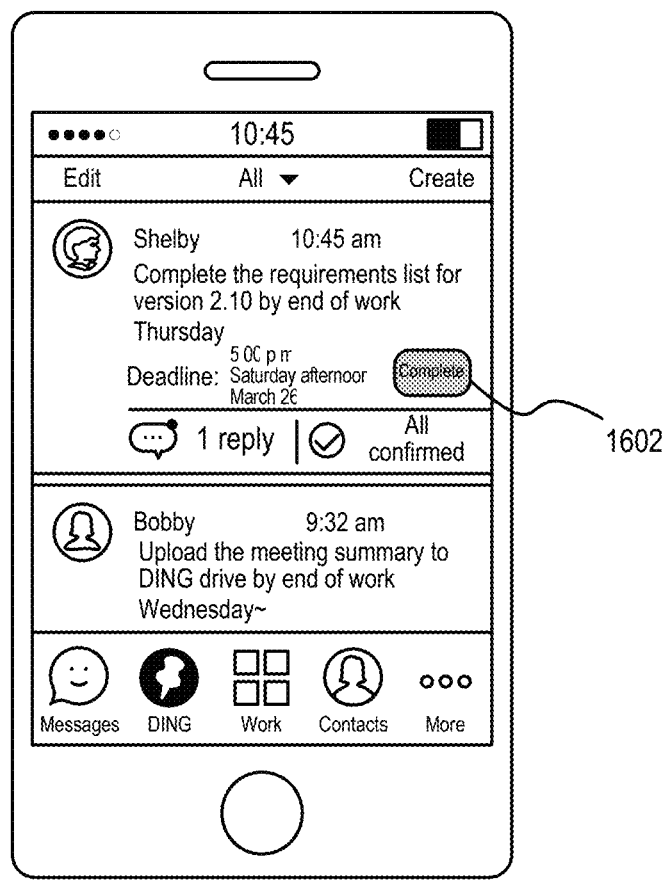
FIG. 16 presents a schematic diagram illustrating an exemplary message display page on a task receiving device, in accordance with an embodiment of the present invention.

FIG. 16 presents a schematic diagram illustrating an exemplary message display page on a task receiving device, in accordance with an embodiment of the present invention. When the state of the task event changes from activated to to-be-confirmed, the system may present the message display page as illustrated in FIG. 16. The system may change a button with label "complete" 1602 to an inoperable state. Furthermore, a message indicating completion of the task may serve as a reply message for the corresponding task event, and is presented as "1 reply" as illustrated in FIG. 16.

Figure 17:
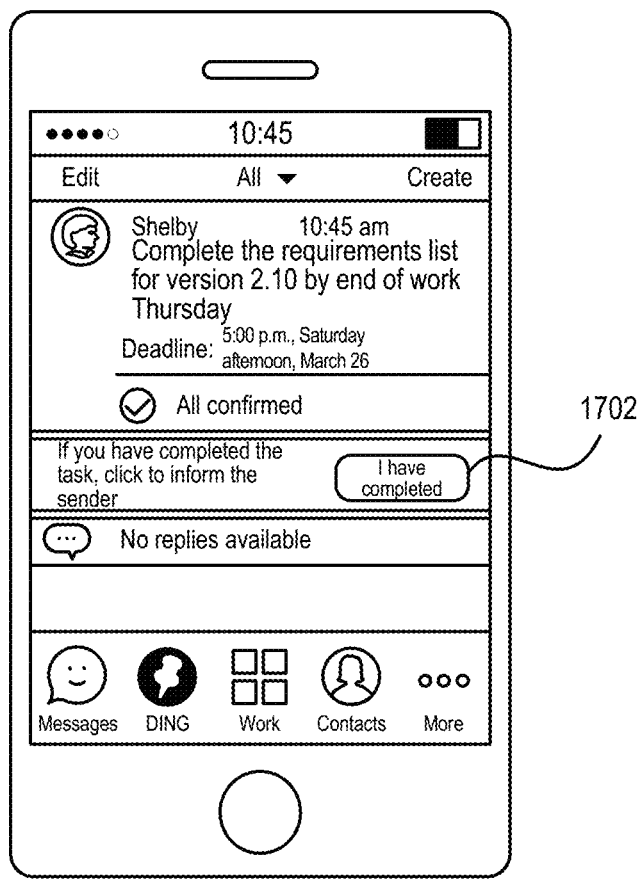
FIG. 17 presents a schematic diagram illustrating an exemplary task display page on a task receiving device, in accordance with an embodiment of the present invention.

For the state illustrated in FIG. 13, when the task receiving device receives user input from the task recipient on the display section of the task event, the system may display the task display page as illustrated in FIG. 17.

FIG. 17 presents a schematic diagram illustrating an exemplary task display page on a task receiving device, in accordance with an embodiment of the present invention. FIG. 17 illustrates another way to receive user input indicating completion of the task event. As shown in FIG. 17, by displaying, for example, the phrase "if you have completed the task, click to inform the sender," the system may guide the task recipient to click on a button with label "I have completed" 1702, which has the same function as the button labeled "complete" 1304 illustrated in FIG. 13.

Figure 18:
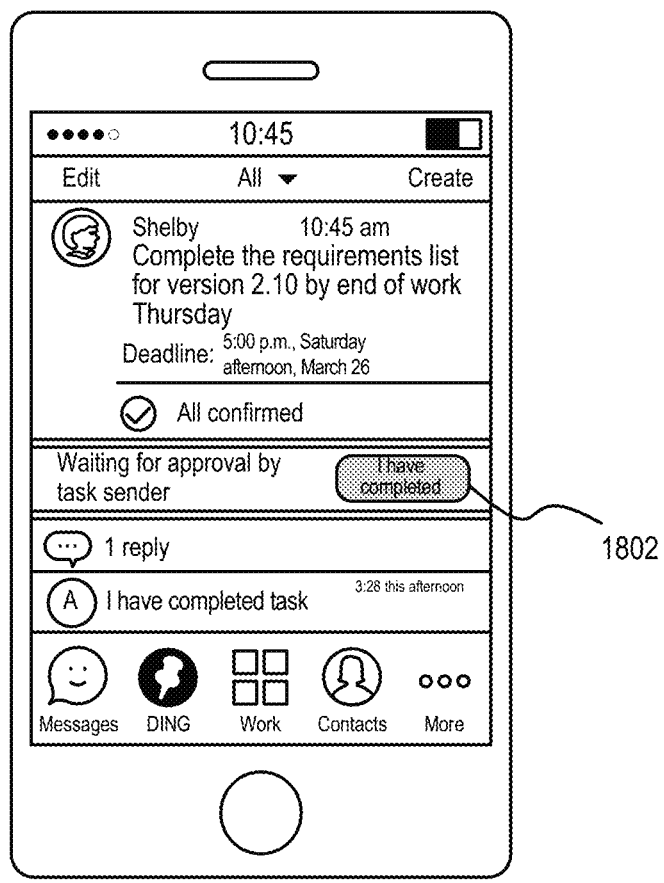
FIG. 18 presents a schematic diagram illustrating an exemplary task display screen on a task receiving device with a button in inoperable mode, in accordance with an embodiment of the present invention.

FIG. 18 presents a schematic diagram illustrating an exemplary task display screen on a task receiving device with a button in inoperable mode, in accordance with an embodiment of the present invention. When the system detects a click operation performed by the task recipient on the button with label "I have completed" 1702 in FIG. 17, the system may change the button with label "I have completed" 1702 to an inoperable state. The button in an inoperable state is displayed as button 1802 in FIG. 18, similar to the "complete" button in inoperable state as illustrated in FIG. 16. The system may also replace the phrase "if you have completed the task, click to inform the sender" displayed in FIG. 17 with the reminder phrase "waiting for approval by task sender" displayed in FIG. 18.

Figure 19:
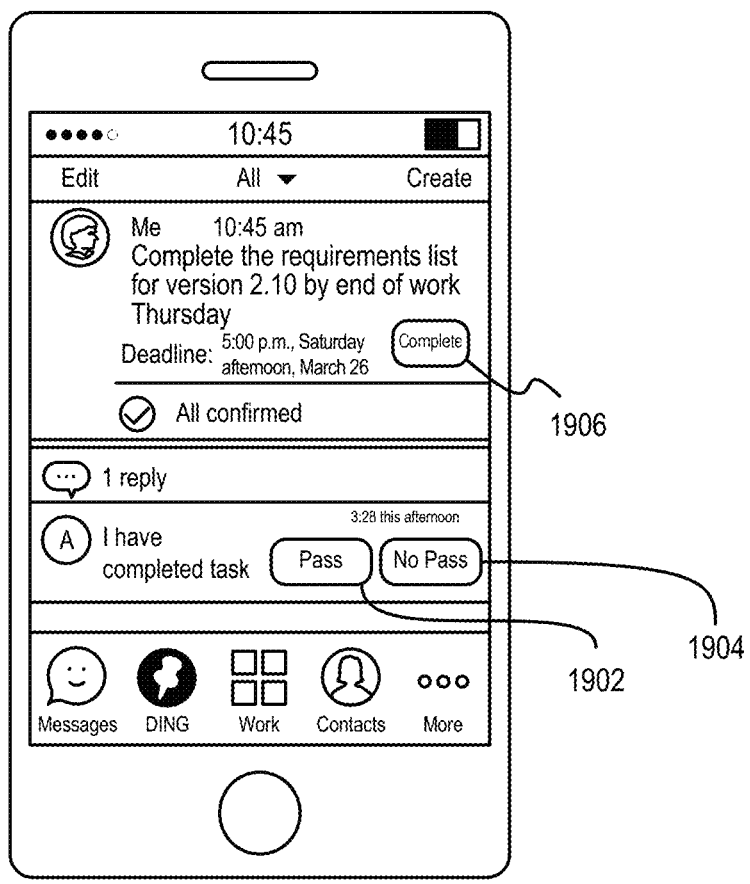
FIG. 19 presents a schematic diagram illustrating an exemplary task display page of a task sending device with pass and no pass options, in accordance with an embodiment of the present invention.

FIG. 19 presents a schematic diagram illustrating an exemplary task display page of a task sending device with pass and no pass options, in accordance with an embodiment of the present invention. When the task sending party receives the message sent by the task recipient indicating that the task has been completed, the task sending device may display a message indicating that the task has been completed on the task display page. For example, the system may display the phrase "I have completed task" as illustrated in FIG. 19. In the embodiment illustrated in FIG. 19, the system displays the message indicating that the task has been completed in the form of a reply message for the task event.

The system may further display buttons with options "pass" and "no pass" 1902, 1904 as illustrated in FIG. 19. If the system detects that the user (e.g., task sending party) selects a "pass" option, the task sending device will return to the task recipient a corresponding message indicating that the task completion has been approved. This means that the task sending party agrees that the task recipient has completed the task event.

The task display page of the task sending device may also include a button labeled "complete" 1906, and when the task sending device detects a user selecting button 1906, the task sending device may send the task recipients an instruction to close the task.

Figure 20:
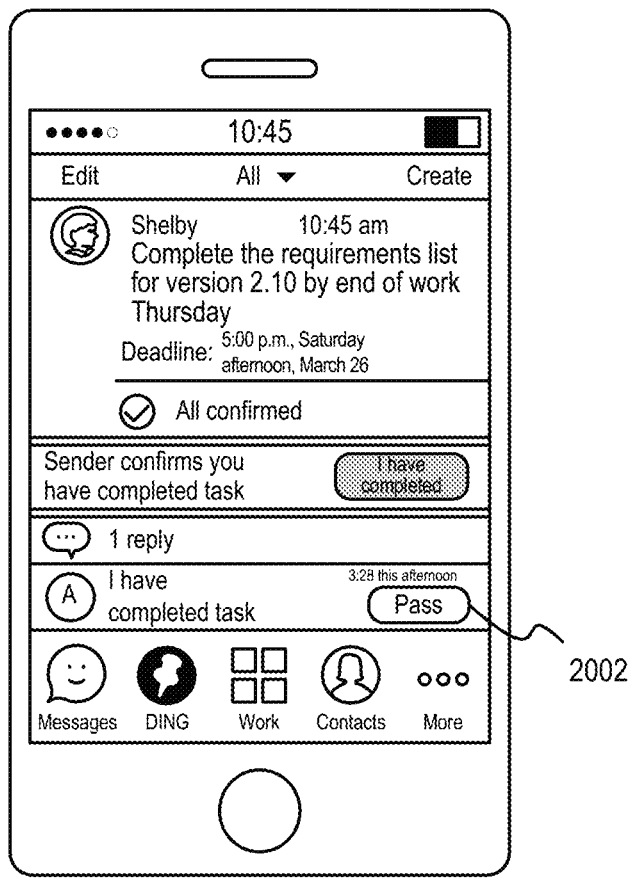
FIG. 20 presents a schematic diagram illustrating an exemplary task display page of a task receiving device, in accordance with an embodiment of the present invention.

FIG. 20 presents a schematic diagram illustrating an exemplary task display page of a task receiving device, in accordance with an embodiment of the present invention. As illustrated in FIG. 20, on the task display page of the task receiving device, the phrase "waiting for approval by task sender" displayed in FIG. 18 may be replaced with the phrase "sender confirms you have completed task," and the device may display a "pass" icon 2002 with a corresponding reply message. This shows that the state of the task event changes from a to-be-confirmed state to a completed state (or the task event may be marked as completed). After this the system no longer needs to perform the second reminding operation for this task recipient.

Figure 21:
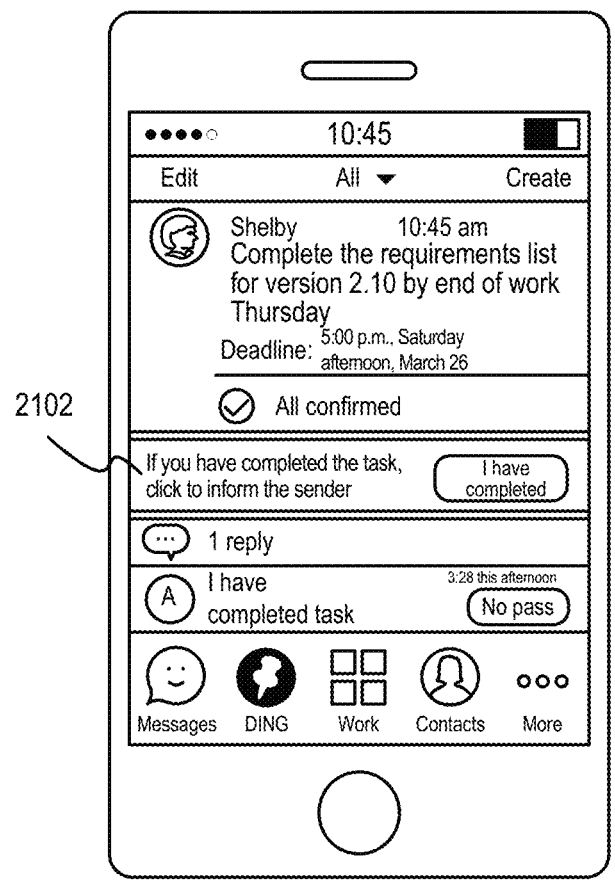
FIG. 21 presents a schematic diagram illustrating an exemplary task display page of the task receiving device, in accordance with an embodiment of the present invention.

FIG. 21 presents a schematic diagram illustrating an exemplary task display page of the task receiving device, in accordance with an embodiment of the present invention. If the system detects that the task sending party selects the "no pass" option, then the task sending device will return to the task recipient a corresponding message indicating that the reported task completion has been rejected. This means that the task sending party does not agree that the task recipient has completed the task event.

Accordingly, as illustrated in FIG. 21, on the task display page of the task receiving device, the task receiving device will change the displayed phrase "waiting for approval by task sender" as illustrated in FIG. 18 to the displayed phrase "if you have completed the task, click to inform the sender" 2102 (e.g., as illustrated in FIG. 17). This means that the task event changes from the to-be-confirmed state back to the activated state.

The system may use any one of a message indicating that a task has been completed, a message indicating approval of task completion, and a message indicating rejection of a completed task as a reply message that is sent to parties associated with a task event. The parties associated with the task event may include at least one of: the task sending party, the sender of the message indicating that the task has been completed, and other parties receiving messages relating to the task. The system may display the message indicating completion of the task on the task display pages of devices associated with the task sending party and the task recipient that sends the message indicating completion of the task. This message may be, for example, the displayed text "I have completed task" as illustrated in FIG. 18 and FIG. 19. Additionally, the system may also display the message indicating completion of the task for all users associated with the task event. For example, other task recipients may receive the message. This is particularly helpful for teamwork application scenarios (e.g., in an enterprise) as it would help team members determine the task progress and promote overall advancement of the project. Similarly, the task sending party may send messages indicating approval or rejection of task completion to one or more users associated with the task event. The task receiving device may display with the reply message a "pass" icon as illustrated in FIG. 20 or a "no pass" icon as illustrated in FIG. 21.

The system may manage the state of the task event by having the task recipient send a message indicating completion of the task to the task sending party. With the message returned by the task sending party indicating approval or rejection of the reported task completion, the task recipient and the task sending party may cross check and confirm that the task is actually completed according to the requirements of both parties. For scenarios where the reported task completion does not meet the requirements of the task sending party, the system may change the state of the task back to the activated state. There is no need for the task sending party to resend the task, which simplifies user operations and improves working efficiency.

The task sending party may also have enforcement management authority for task events. That is, based on receiving user input instructing to close a task event, the task sending party may send an instruction to close the task event to at least one target object (e.g., all of the task recipients for the task event). This instruction may, for example, specify that all of the task recipients change the state of the task event to completed based on the instruction to close the task event. A task receiving device that receives the instruction to close the task event may proceed to change a state of the task event to completed. This achieves unified management of all of the task recipients, which simplifies management operations of the task sending party and improves management efficiency. For example, as illustrated in FIG. 19, the task display page of the task sending device may include the button labeled "complete" 1906, and when the task sending device detects a user selecting button 1906, the task sending device may send the task recipients an instruction to close the task.

In some embodiments, the task receiving device may automatically close (e.g., change state of the task event to completed) a task event upon receiving instruction from a task sending device and/or server to close the task event. The task sending device may also automatically close a task upon authenticating that the source of the instruction to close the task event is the task sending device and/or server, and is not a malicious third party sending device. The task sending device may also automatically authenticate the source of any communications associated with task events. Authenticating the source of the instructions/communications improves network security, especially the security associated with the task event communications. In some embodiments, the task receiving device may automatically send updated task information back to the task sending device. The updated information may be sent in response to the instruction to close the task event and/or after authenticating the source of the instruction and/or at different time intervals. The task receiving device may also automatically send a message back to the task sending device that the state of the task event has been changed to completed.

Figure 22:
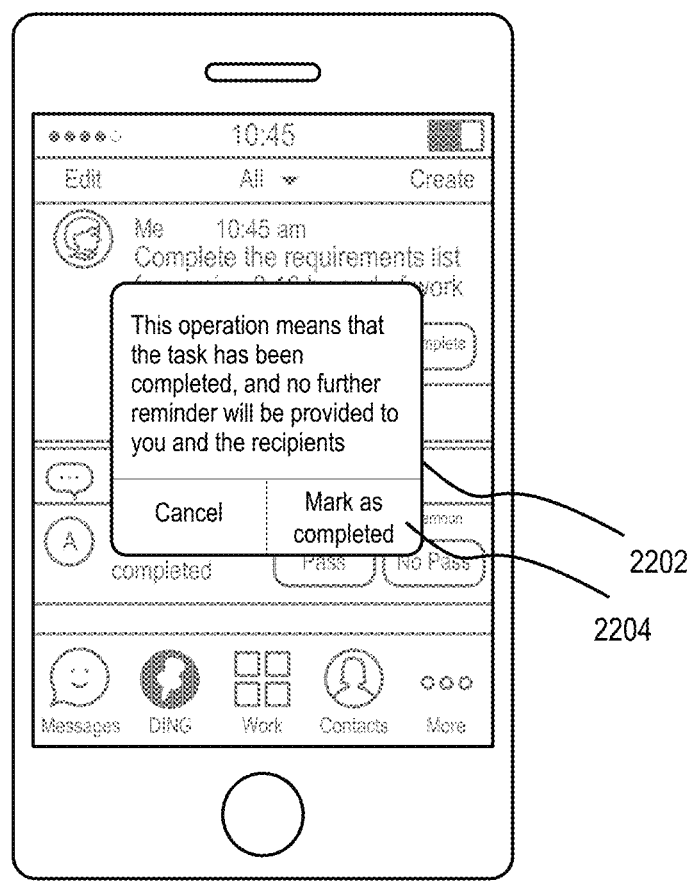
FIG. 22 presents a schematic diagram illustrating an exemplary task display page of the task sending device, in accordance with an embodiment of the present invention.

FIG. 22 presents a schematic diagram illustrating an exemplary task display page of a task sending device, in accordance with an embodiment of the present invention. To avoid confusion, the system may apply a double confirmation mechanism. That is, when the system receives user input selecting the button with label "complete" 1906 in FIG. 19, the system may display a floating window 2202 as illustrated in FIG. 22. The system may also display a reminder phrase "this operation means that the task has been completed, and no further reminder will be provided to you and the recipients." When the system detects that the user has selected an option button with the displayed text "mark as completed" 2204, the system may then send the instruction for closing the task to the task recipients.

Figure 23:
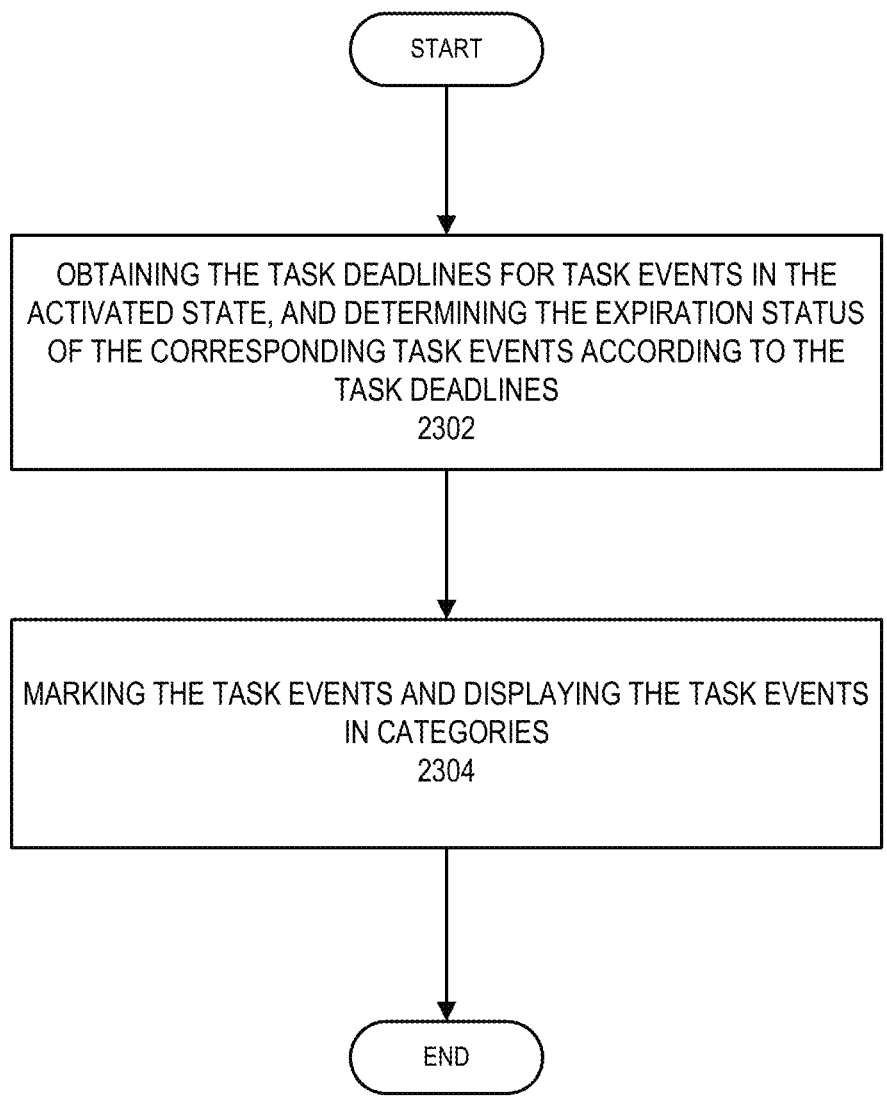
FIG. 23 presents a flowchart illustrating an exemplary task categorizing method, in accordance with an embodiment of the present invention.

FIG. 23 presents a flowchart illustrating an exemplary task categorizing method, in accordance with an embodiment of the present invention. The system may apply the method alone in a task receiving device, or the system may apply the method in a task receiving device with any of the above embodiments. In particular, the method may include the following operations:

The system may obtain the task deadlines for task events in the activated state, and determine the expiration status of the corresponding task events according to the task deadlines (operation 2302). Expiration status may refer to, for example, whether the deadline is not yet expired, close-to-expiring, or expired.

The system may mark the task events and display the task events in categories (operation 2304). Each task event may be associated with a corresponding task deadline. The system may mark and display expired or close-to-expiring task events in different categories, so that a user may quickly look up and process the task events. The system may apply the process illustrated in FIG. 23 at the task receiving device or at the task sending device, and in both cases may assist the respective party to increase processing speed and efficiently manage task events.

Figure 24:
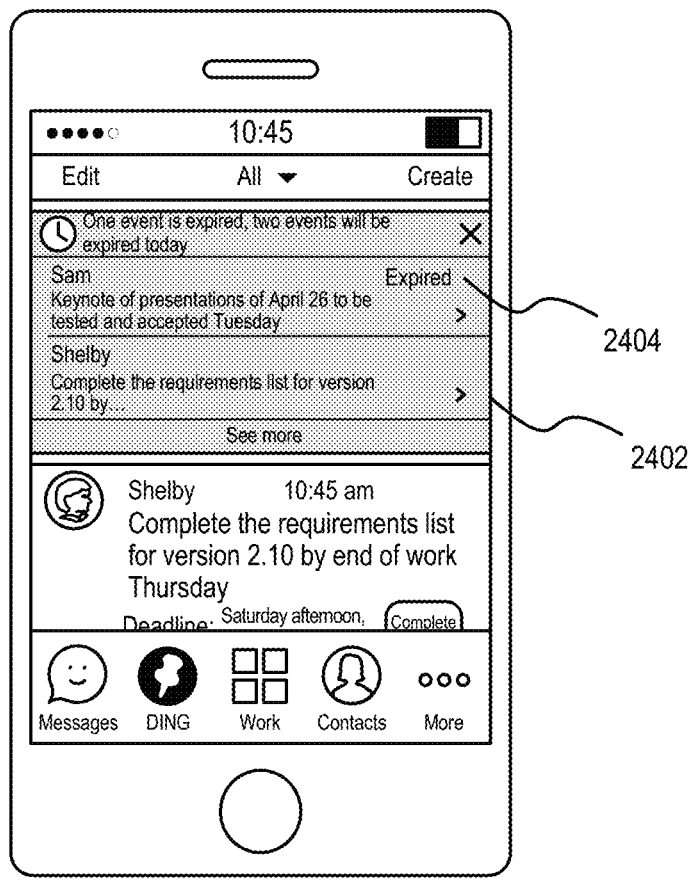
FIG. 24 presents a schematic diagram illustrating an exemplary task display page of a task receiving device, in accordance with an embodiment of the present invention.

FIG. 24 presents a schematic diagram illustrating an exemplary task display page of a task receiving device, in accordance with an embodiment of the present invention. Using DingTalk as an example, the system may implement a task event as a DING message that includes a deadline. As illustrated in FIG. 24, using the task display page of a task receiving device as an example, the system may form a distinguishing display section 2402 at the top of the task display page. The distinguishing display section is configured with a predetermined background color to differentiate it from the other display sections.

The task events may be classified into expired task events or not expired task events according to the respective deadlines. The expired classification means the task deadline has passed, while the not expired classification means the task deadline has not yet passed. Based on the classification described above, the expired task events may be marked with text "expired" 2404 as illustrated in FIG. 24. The system may display text such as "not expired" to mark other task events, or, in order to highlight the expired task events, the system may not separately mark not expired task events, as illustrated in FIG. 24.

As illustrated in FIG. 24, other classifications may also be used. For example, the system may further classify the not expired task events as close-to-expiring task events and other-not-expired task events. The close-to-expiring classification means that the deadline has not passed but is very close (e.g., within a predetermined threshold). For example, the current date may be the last day of the task deadline. The other-not-expired task classification means that the deadline has not passed and is not close. For example, the current date may be more than one day from the task deadline.

In order to highlight the urgency of time limits and allow the task recipient to process task events as soon as possible, the system may display the expired task events and the close-to-expiring task events together in distinguishing display section 2402 illustrated in FIG. 24. The system may display the other-not-expired task events in the normal display section. Since the expired task event has the "expired" visual indicator, a user may easily distinguish visually the time limits of individual task events. The user may easily determine the status of the task because the expired task event is in the distinguishing display section with the "expired" visual indicator, while the close-to-expiring task events are in the distinguishing display section but without the "expired" visual indicator. The other-not-expired task events are displayed in the normal display section.

Figure 25:
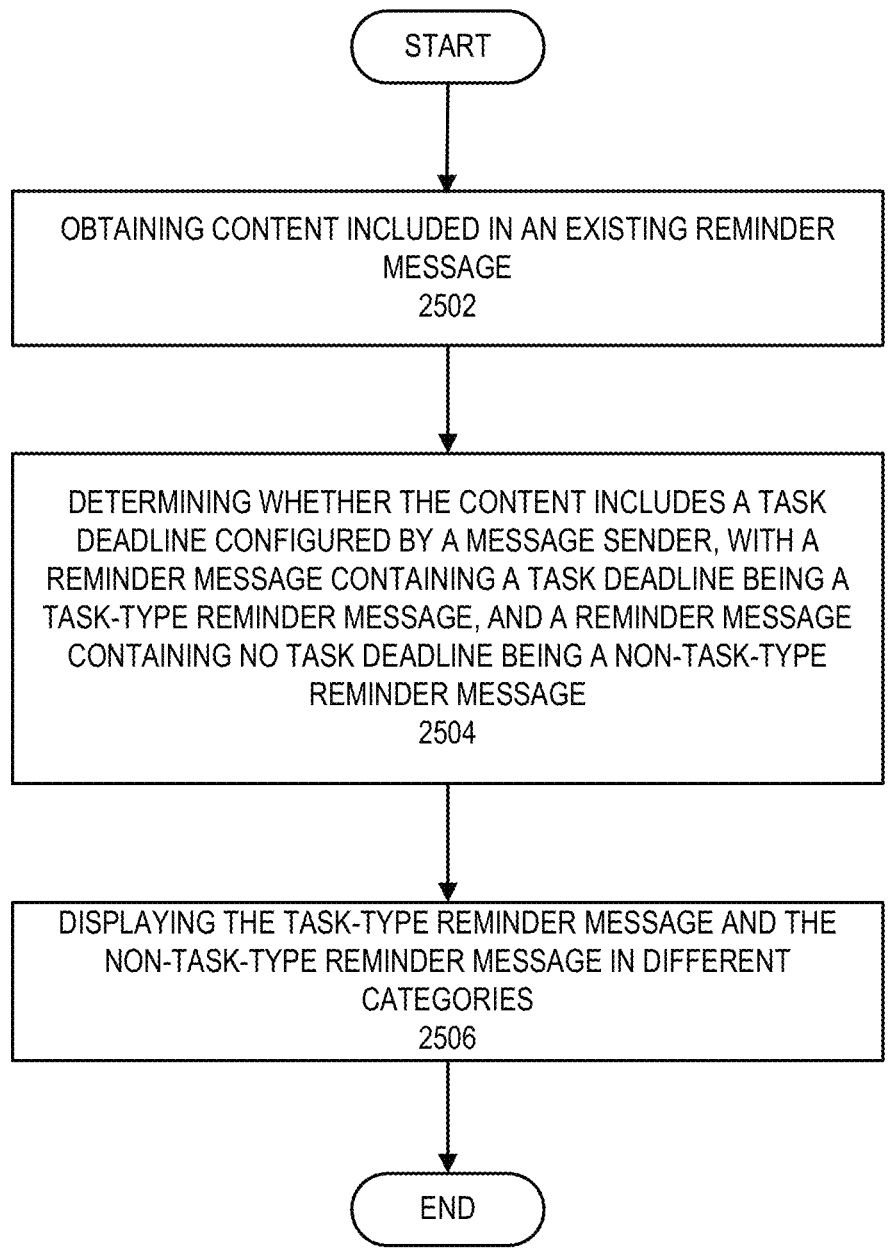
FIG. 25 presents a flowchart illustrating another exemplary task processing method, in accordance with an embodiment of the present invention.

FIG. 25 presents a flowchart illustrating another exemplary task processing method, in accordance with an embodiment of the present invention. As illustrated in FIG. 25, the system may apply the method by itself on a task receiving device. The system also apply the method on the task receiving device with any of the above described embodiments. In particular, the method may include the following operations:

The system may obtain content included in an existing reminder message (operation 2502).

The system may determine whether the content includes a task deadline configured by a message sender. The system may determine that a reminder message containing a task deadline is a task-type reminder message, and a reminder message containing no task deadline is a non-task-type reminder message (operation 2504).

The system may display the task-type reminder message and the non-task-type reminder message in different categories (operation 2506).

The task event may be sent via a reminder message. With enterprise instant messaging application DingTalk, the system may implement the task event with a DING message. The task event may include a corresponding task deadline. Compared with the reminder messages of related technology, the reminder message with the task event in embodiments of the present invention is distinguished in at least the following aspect: the reminder message with the task event in embodiments of the present invention includes a task deadline of the task event, while the reminder message in related technology does not include such a task deadline. Therefore, one may classify the reminder message of the present disclosure as a task-type reminder message, while the reminder messages in related technology may be classified as non-task-type reminder messages.

Figure 26:
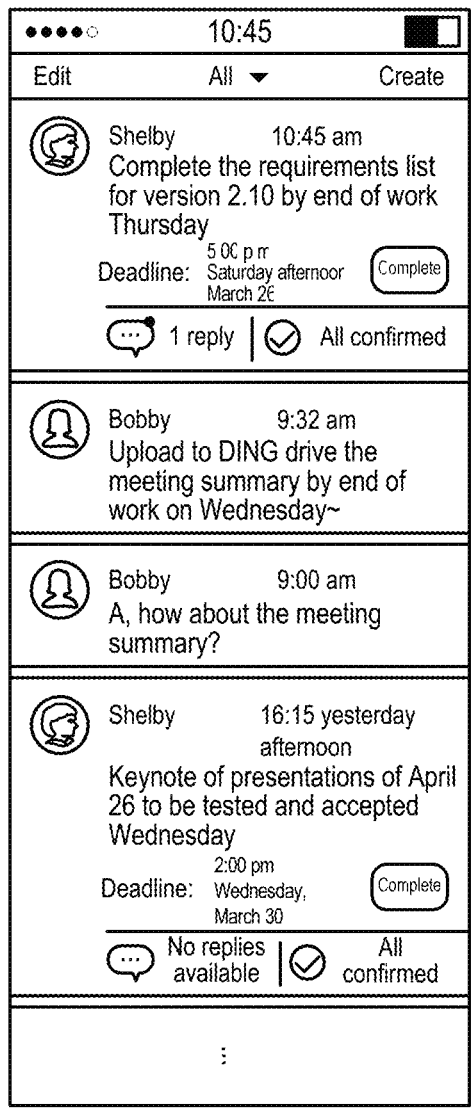
FIG. 26 presents a schematic diagram illustrating an exemplary display of all reminder messages, in accordance with an embodiment of the present invention.

FIG. 26 presents a schematic diagram illustrating an exemplary display of all reminder messages, in accordance with an embodiment of the present invention. As illustrated in FIG. 26, when a user selects "all" to display the reminder messages, the system arranges all of the reminder messages in a reverse order according to the receiving time. There are generally less task-type reminder messages than non-task-type reminder messages, and the difference in quantity between the two may be large. For example, there may be only 10 task-type reminder messages, but 900 non-task-type reminder messages. If the task recipient wants to view received task-type reminder messages from the history, it may be difficult for the user to view it quickly.

Figure 27:
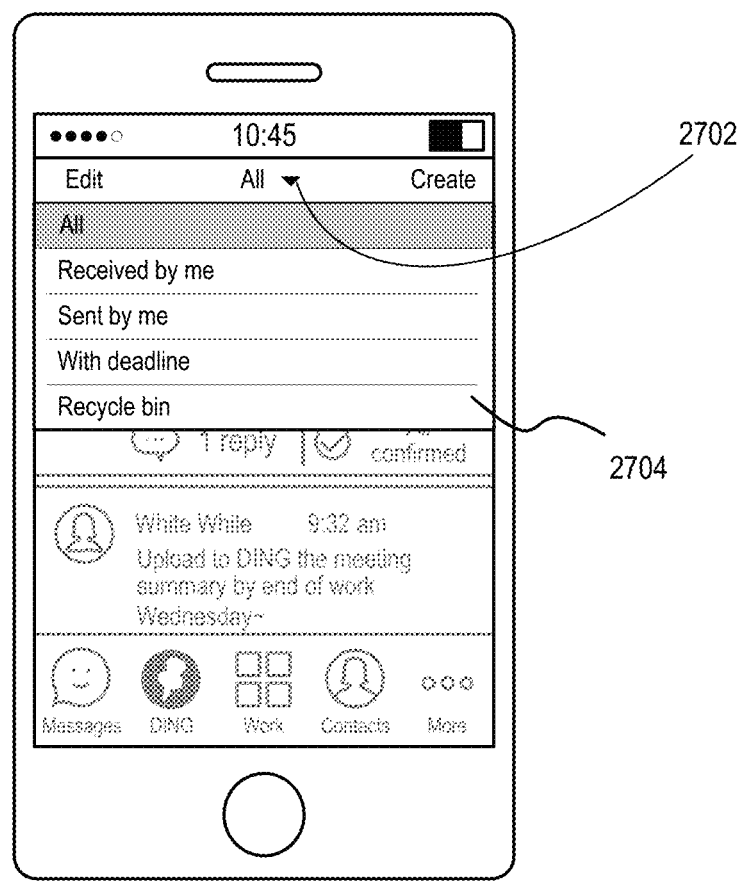
FIG. 27 presents a schematic diagram illustrating an exemplary category options menu, in accordance with an embodiment of the present invention.

FIG. 27 presents a schematic diagram illustrating an exemplary category options menu, in accordance with an embodiment of the present invention. As illustrated in FIG. 27, when the system detects the task recipient (or the task sending party) touching the inverted triangle 2702 near the displayed text "all," the system may display a menu of category options 2704. For example, the system may display categories such as "all," "received by me," "sent by me," "with deadline," and "recycle bin."

Figure 28:
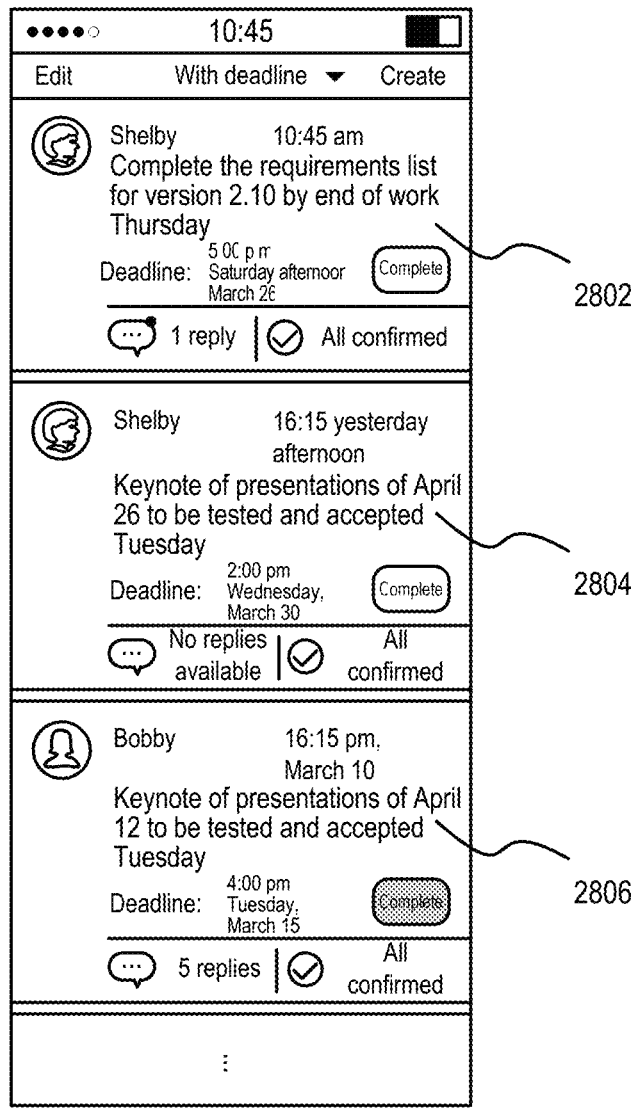
FIG. 28 presents a schematic diagram illustrating an exemplary display of all of the task-type reminder messages, in accordance with an embodiment of the present invention.

FIG. 28 presents a schematic diagram illustrating an exemplary display of all of the task-type reminder messages, in accordance with an embodiment of the present invention. When the system detects the user selecting "with deadline," as illustrated in FIG. 28, the system may select and display all of the task-type reminder messages. Three task-type reminder messages 2802-2806 are illustrated in FIG. 28. The first two messages 2802, 2804 are task events in the activated state, while the third message 2806 is a task event in the completed state.

By distinguishing display of task-type reminder messages and the non-task-type reminder messages, a user may quickly view certain types of reminder messages, thereby improving lookup efficiency and processing efficiency.

Exemplary Electronic Device

Figure 29:
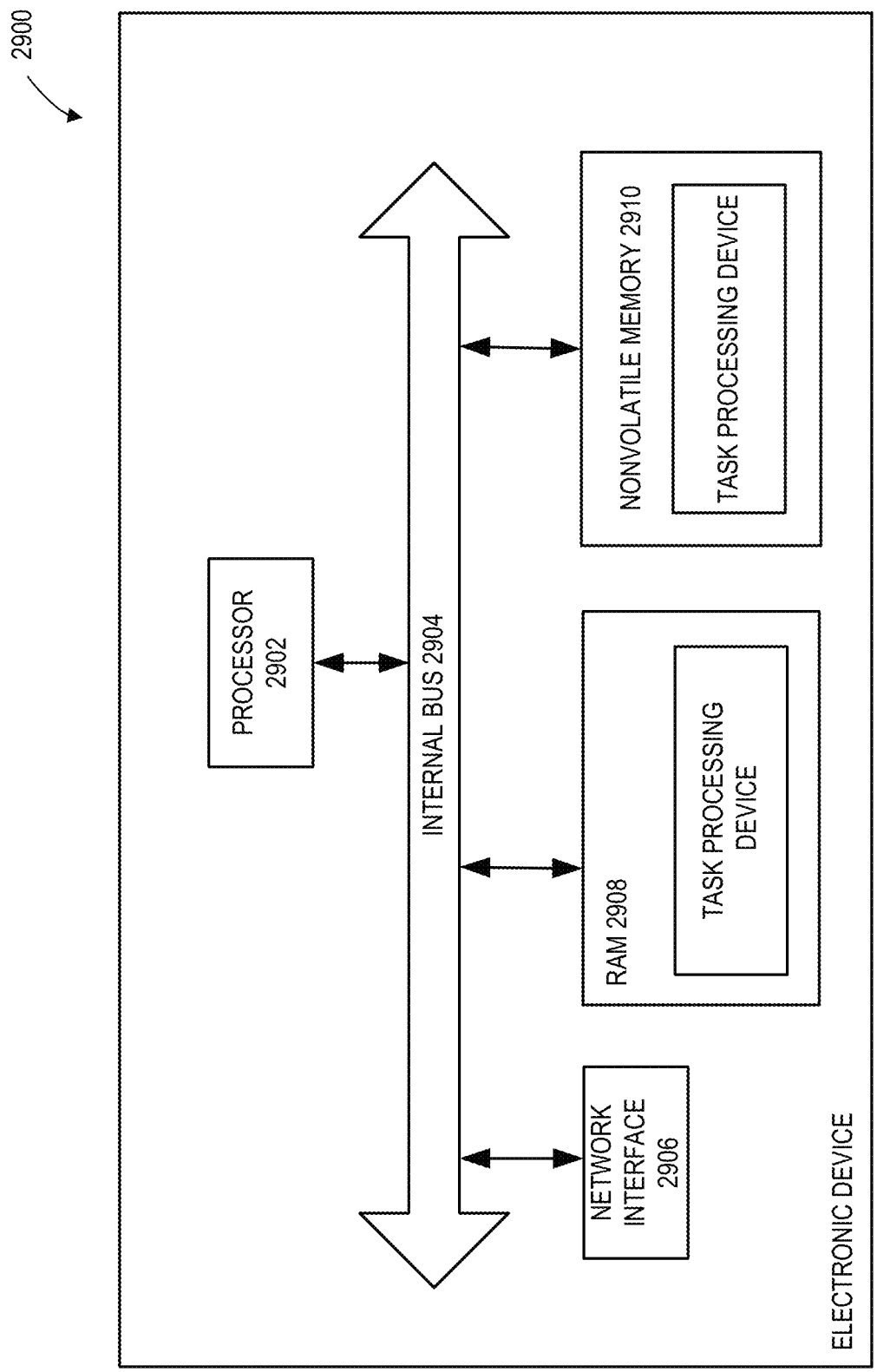
FIG. 29 presents a schematic diagram illustrating an exemplary electronic device, in accordance with an embodiment of the present invention.

FIG. 29 presents a schematic diagram illustrating an exemplary electronic device 2900, in accordance with an embodiment of the present invention. Electronic device 2900 may represent a task sending device or a task receiving device. At the hardware level, electronic device 2900 may include a processor 2902, an internal bus 2904, a network interface 2906, random access memory (RAM) 2908, and nonvolatile memory 2910. The electronic device may include other components for task processing. Processor 2902 may read a corresponding computer program from nonvolatile memory 2910 and store the computer program in RAM 2908, and then execute the program.

Exemplary Task Processing Device

Figure 30:
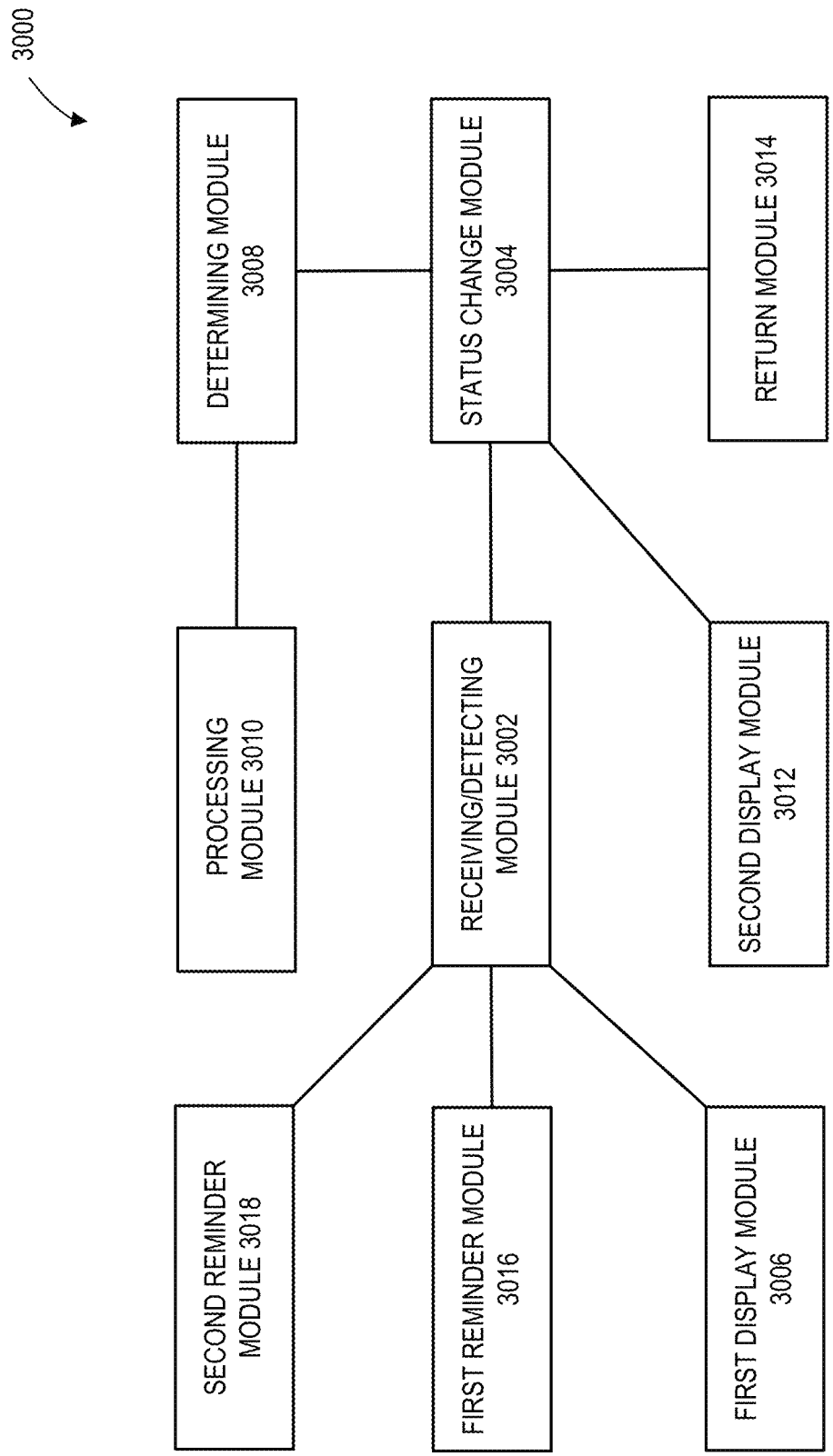
FIG. 30 presents a schematic diagram illustrating an exemplary task processing device, in accordance with an embodiment of the present invention.

FIG. 30 presents a schematic diagram illustrating an exemplary task processing device 3000, in accordance with an embodiment of the present invention. Task processing device 3000 may represent, for example, a task sending device and/or a task receiving device. Note that in some scenarios a device may operate as both a task sending device and a task receiving device if the user is both sending and receiving tasks. Task processing device 3000 may include a receiving/detecting module 3002, a status change module 3004, a first display module 3006, a determining module 3008, a processing module 3010, a second display module 3012, a return module 3014, a first reminder module 3016, and a second reminder module 3018.

Receiving/detecting module 3002 may receive a task event sent by a task sending device. The initial state of the task event is a to-be-accepted state.

Status change module 3004 may change the state of the task from the to-be-accepted state to an activated state when a predetermined user response is detected. The predetermined user response may be responsive to a first reminder for the task event.

First display module 3006 may display task-type reminder messages with task deadlines and non-task-type reminder messages without task deadlines in different categories.

Determining module 3008 may obtain the task deadlines for task events in the activated state, and determine the expiration statuses of the task events according to the task deadlines.

Processing module 3010 may mark the task events according to the respective expiration statuses (e.g., expired, close-to-expiring, or not expired) and display the task events in categories according to the respective expiration statuses.

Second display module 3012 may use a corresponding display method to display content associated with the task event based on the state of the task event.

Return module 3014 may return related state change information to the task sending party when the state of the task event changes from a to-be-accepted state to an activated state, so that the task sending party may be informed of the task acceptance.

First reminder module 3016 may obtain information indicating a predetermined reminder cycle for the task event, and may perform a second reminding operation for the task event according to the predetermined reminding cycle before marking the task as in a completed state.

Second reminder module 3018 may perform the second reminding operation associated with the task in response to a reminding instruction sent by a server. The server may send the reminding instruction according to a predetermined reminding cycle for the task event.

Exemplary Task Processing Device

Figure 31:
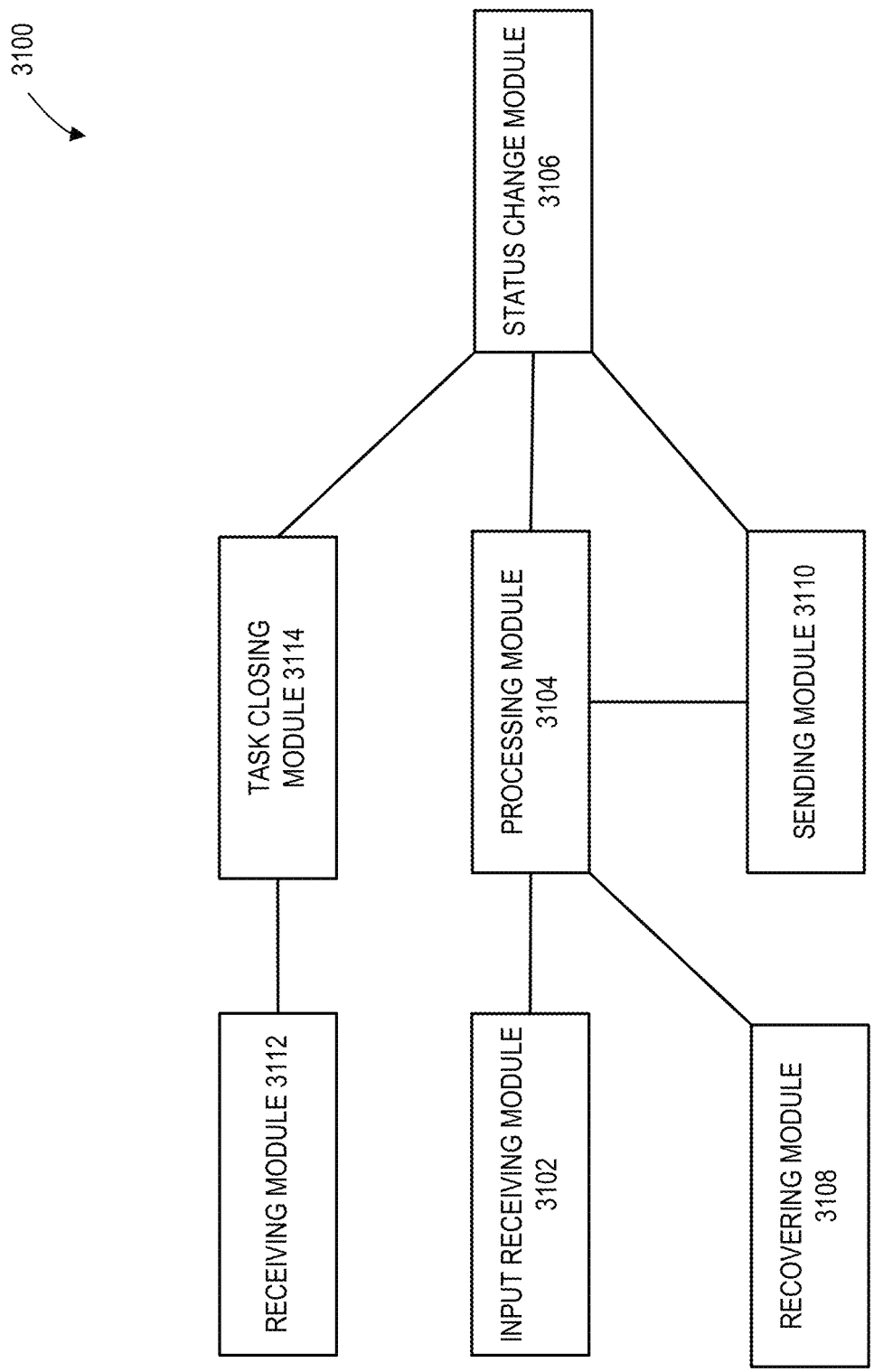
FIG. 31 presents a schematic diagram illustrating an exemplary task processing device, in accordance with an embodiment of the present invention.

FIG. 31 presents a schematic diagram illustrating an exemplary task processing device 3100, in accordance with an embodiment of the present invention. Task processing device 3100 may represent a task sending device and/or a task receiving device. Note that in some scenarios a device may operate as both a task sending device and a task receiving device if the user is both sending and receiving tasks. Task processing device 3100 may include an input receiving module 3102, a processing module 3104, a status change module 3106, a recovering module 3108, a sending module 3110, a receiving module 3112, and a task closing module 3114.

Input receiving module 3102 may receive user input confirming completion of a task event in an activated state.

Processing module 3104 may send to the task sending party a message indicating completion of the task, and change the state of the task event from the activated state to a to-be-confirmed state.

Status change module 3106 may change the state of the task event from the to-be-confirmed state to a completed state upon receiving a message indicating approval of task completion sent by the task sending party.

Recovering module 3108 may change the state of the task event from the to-be-confirmed state to the activated state upon receiving a message indicating rejection of completion of the task sent by the task sending party.

Sending module 3110 may send one of a message indicating that a task event has been completed, a message indicating approval of task completion, and a message indicating rejection of a completed task event as a reply message to a party associated with a task event. The parties associated with the task event may include at least one of: the task sending party, the sender of the message indicating that the task has been completed, and other parties receiving messages relating to the task event.

Receiving module 3112 may receive an instruction from the task sending party to close an activated task event.

Task closing module 3114 may change the state of the task event to the completed state.

Exemplary Task Processing Device

FIG. 32 presents a schematic diagram illustrating an exemplary task processing device 3200, in accordance with an embodiment of the present invention. Task processing device 3200 may represent a task sending device and/or a task receiving device. Note that in some scenarios a device may operate as both a task sending device and a task receiving device if the user is both sending and receiving tasks. Task processing device 3200 may include an obtaining module 3202, an identifying module 3204, and a displaying module 3206.

Obtaining module 3202 may obtain content included in an existing reminder message.

Identifying module 3204 may determine whether the content includes a task deadline configured by a message sender. Identifying module 3204 may determine that a reminder message containing a task deadline is a task-type reminder message, and a reminder message containing no task deadline is a non-task-type reminder message.

Displaying module 3206 may display the task-type reminder message and the non-task-type reminder message in different categories.

Exemplary Task Processing Device

FIG. 33 presents a schematic diagram illustrating an exemplary task processing device 3300, in accordance with an embodiment of the present invention. Task processing device 3300 may represent a task sending device. Note that in some scenarios a device may operate as both a task sending device and a task receiving device if the user is both sending and receiving tasks. Task processing device 3300 may include a generating module 3302, a configuring module 3304, and a sending module 3306.

Generating module 3302 may generate a task event with a communication message as the content of the task event based on user input detected for the communication message when displayed in a message session window.

Configuring module 3304 may configure the deadline for the task event based on receiving user configuration input with respect to the task event.

Sending module 3306 may generate a reminder message that includes the task event information, and send the reminder message to a target object. The target object may thereby obtain the task event information through the reminder.

Optionally, the reminder message may include a corresponding predetermined reminder type, in which the predetermined reminder type indicates how the reminder operation is to be performed.

Exemplary Task Processing Device

FIG. 34 presents a schematic diagram illustrating an exemplary task processing device 3400, in accordance with an embodiment of the present invention. Task processing device 3400 may represent a task sending device and/or a task receiving device. Note that in some scenarios a device may operate as both a task sending device and a task receiving device if the user is both sending and receiving tasks. Task processing device 3400 may include a task generating module 3402, a reminder generating module 3404, a sending module 3406, and a task closing module 3408.

Task generating module 3402 may generate a task event based on user-configured task content and a deadline specified by the user.

Reminder generating module 3404 may generate a reminder message that includes the task event, and determine a reminder type for the reminder message based on user input selecting the reminder type.

Sending module 3406 may use the selected reminder type to send the reminder message to at least one target object (e.g., a task receiving device), thereby performing the reminder operation for the target object and allowing the target object to obtain the task information.

Task closing module 3408 may send an instruction to close a task event to at least one target object (e.g., a task receiving device) in response to receiving user input instructing to close the task event. The task receiving device may then change a state of the task event to a completed state.

Exemplary Embodiments

Embodiments of the present disclosure include a system for task processing. During operation, the system may receive a task event generated by a task sending device with a state of the task event being a to-be-accepted state. The system may perform a first reminding operation associated with the task event for a user. Upon receiving a predetermined user response, the system may change the state of the task event from the to-be-accepted state to an activated state. The predetermined user response is responsive to the first reminding operation associated with the task event.

In a variation on this embodiment, when a reminder message is sent based on a predetermined reminder type configured using the task sending device, the first reminding operation is performed according to the predetermined reminder type.

In a further variation, the task event includes a deadline configured using the task sending device. The system may also display in a plurality of different categories a plurality of reminder messages with task deadlines and a plurality of reminder messages without task deadlines.

In a variation on this embodiment, the task event includes a deadline configured using the task sending device. The system may also obtain one or more task deadlines of task events in the activated state, and determine one or more expiration statuses of the corresponding task events according to the task deadlines.

In a variation on this embodiment, based on the state of the task event, the system may also display related content of the task event using a corresponding display method.

In a variation on this embodiment, upon changing the state of the task event from the to-be-accepted state to the activated state, the system may return state change information to the task sending device, thereby informing a task sending party associated with the task sending device that the task event is accepted.

In a variation on this embodiment, the system may obtain information indicating a predetermined reminder cycle for the task event, and perform at least one of the following operations. The system may perform a second reminding operation for the task event according to the predetermined reminding cycle before marking the task event as completed. The system may also perform a second reminding operation associated with the task event in response to receiving a reminding instruction. The reminding instruction may be sent according to a predetermined reminding cycle for the task event.

In a variation on this embodiment, the system may receive confirmation input from the user that the task event in the activated state has been completed. The system may send to the task sending device a message indicating completion of the task event. The system may then change the state of the task event from the activated state to a to-be-confirmed state. Subsequently, the system may change the state of the task event from the to-be-confirmed state to a completed state upon receiving a message indicating approval of task completion sent by the task sending device.

In a further variation, upon receiving, from the task sending device, a message disapproving of a task completion, the system may change the system the state of the task event from the to-be-confirmed state to the activated state.

In a further variation, the system may send one of a message indicating that a task event has been completed, a message indicating approval of task completion, and a message indicating rejection of a completed task event as a reply message to a computing device associated with a task event. The party associated with the task event may include at least one of: a task sending party, a sender of the message indicating that the task has been completed, and other parties receiving messages relating to the task event.

In a further variation, the system may receive an instruction from the task sending device to close the activated task event, and change the state of the activated task event to a completed state.

In a variation on this embodiment, the system may obtain task deadlines for a plurality of task events in the activated state. The system may then determine expiration statuses for the task events according to the task deadlines. The system may mark each of the task events according to a respective expiration status, and display each of the task events in a category according to the respective expiration status.

In a variation on this embodiment, the system may obtain content included in a reminder message. The system may determine that the content includes a task deadline configured by a message sender. The system may determine that the reminder message containing the task deadline is a task-type reminder message. The system may then display the task-type reminder message in a category separate from non-task-type reminder messages, in which the non-task-type reminder messages contain no task deadlines.

In a variation on this embodiment, the system may detect user input for a communication message in a message session window. The system may then generate a new task event with one or more content of the communication message as a content of the new task event. The system may configure a deadline for the new task event based on receiving user configuration input with respect to the new task event. The system may then generate a reminder message that includes the content of the new task event and the deadline as task event information, and send the reminder message to a task receiving device.

In a further variation, the reminder message includes a corresponding predetermined reminder type, and the corresponding predetermined reminder type indicates how a reminder operation is to be performed.

In a variation on this embodiment, the system may generate a new task event based on user-configured task content and a deadline configured by a user. The system may generate a reminder message that includes the new task event. The system may then determine a reminder type for the reminder message based on user input selecting the reminder type. The system may use the selected reminder type to send the reminder message to at least one task receiving device, thereby performing a reminder operation for the task receiving device and allowing the task receiving device to obtain task information.

In a variation on this embodiment, responsive to receiving user input instructing to close the task event, the system may send an instruction to close the task event to at least one task receiving device.

In a variation on this embodiment, responsive to receiving an instruction from the task sending device to close the task event, the system may authenticate the source of the instruction, and automatically change the state of the task event to completed upon successfully authenticating the source of the instruction.

Exemplary Task Processing Device

Figure 35:
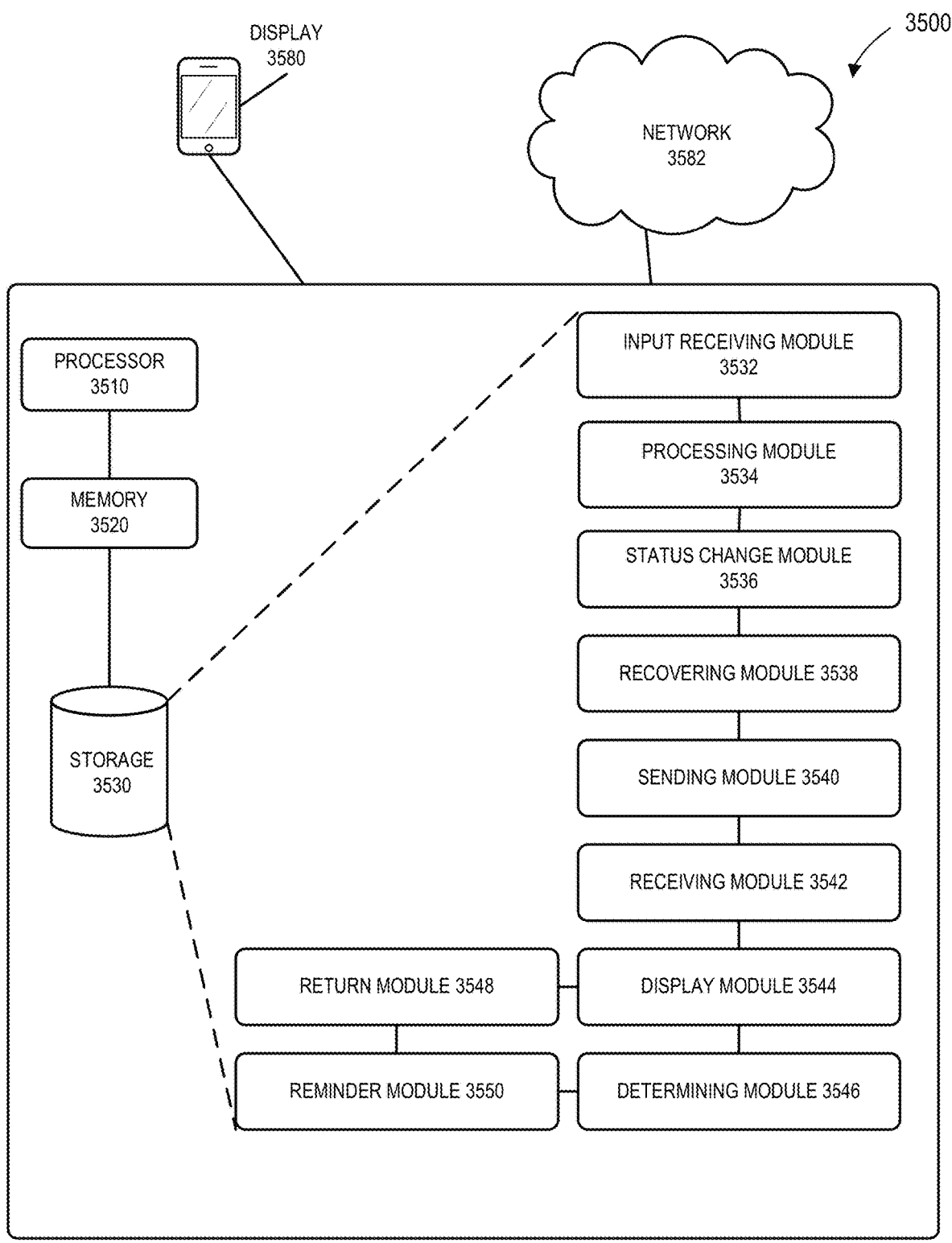
FIG. 35 presents a schematic diagram illustrating an exemplary task processing device, in accordance with an embodiment of the present invention.

FIG. 35 presents a schematic diagram illustrating an exemplary task processing device 3500, in accordance with an embodiment of the present application. Task processing device 3500 may include a processor 3510, a memory 3520, and a storage device 3530. Storage 3530 typically stores instructions that can be loaded into memory 3520 and executed by processor 3510 to perform the methods described above. In one embodiment, the instructions in storage 3530 can implement an input receiving module 3532, a processing module 3534, a status change module 3536, a recovering module 3538, a sending module 3540, a receiving module 3542, a display module 3544, a determining module 3546, a return module 3548, and a reminder module 3550, which can communicate with each other through various means.

In some embodiments, modules 3532-3550 can be partially or entirely implemented in hardware and can be part of processor 3510. Further, in some embodiments, the task processing device may not include a separate processor and memory. Instead, in addition to performing their specific tasks, modules 3532-3550, either separately or in concert, may be part of special-purpose computation engines.

Storage 3530 stores programs to be executed by processor 3510. Specifically, storage 3530 stores a program that implements a device for task processing. During operation, the application program can be loaded from storage 3530 into memory 3520 and executed by processor 3510. As a result, task processing device 3500 can perform the functions described above. Task processing device 3500 can further include a display 3580, and can be coupled via one or more network interfaces to a network 3582.

Input receiving module 3532 may receive user input confirming completion of a task event in an activated state.

Processing module 3534 may mark the task events according to the respective expiration statuses (e.g., expired, close-to-expiring, or not expired) and display the task events in categories according to the respective expiration statuses. Processing module 3534 may also send to the task sending party a message indicating completion of the task, and change the state of the task event from the activated state to the to-be-confirmed state.

Status change module 3536 may change the state of the task from the to-be-accepted state to an activated state when a predetermined user response is detected. The predetermined user response may be responsive to a first reminder for the task event.

Status change module 3536 may also change the state of the task event from a to-be-confirmed state to a completed state upon receiving a message indicating approval of task completion sent by the task sending party.

Recovering module 3538 may change the state of the task event from the to-be-confirmed state to the activated state upon receiving a message indicating rejection of completion of the task sent by the task sending party.

Sending module 3540 may send one of a message indicating that a task event has been completed, a message indicating approval of task completion, and a message indicating rejection of a completed task event as a reply message to a party associated with a task event. The party associated with the task event may include at least one of: the task sending party, the sender of the message indicating that the task has been completed, and other parties receiving messages relating to the task event.

Receiving module 3542 may receive a task event sent by a task sending device. The initial state of the task event is a to-be-accepted state. Receiving module 3542 may also receive an instruction from the task sending party to close an activated task event.

Display module 3544 may display task-type reminder messages with task deadlines and non-task-type reminder messages without task deadlines in different categories. Display module 3544 may also use a corresponding display method to display content associated with the task event based on the state of the task event.

Determining module 3546 may obtain the task deadlines for task events in the activated state, and determine the expiration statuses of the task events according to the task deadlines.

Return module 3548 may return related state change information to the task sending party when the state of the task event changes from a to-be-accepted state to an activated state, so that the task sending party may be informed of the task acceptance.

Reminder module 3550 may obtain information indicating a predetermined reminder cycle for the task event, and may perform a second reminding operation for the task event according to the predetermined reminding cycle before marking the task as in a completed state.

Reminder module 3550 may also perform the second reminding operation associated with the task in response to a reminding instruction sent by a server. The server may send the reminding instruction according to a predetermined reminding cycle for the task event.

Exemplary Server

Figure 36:
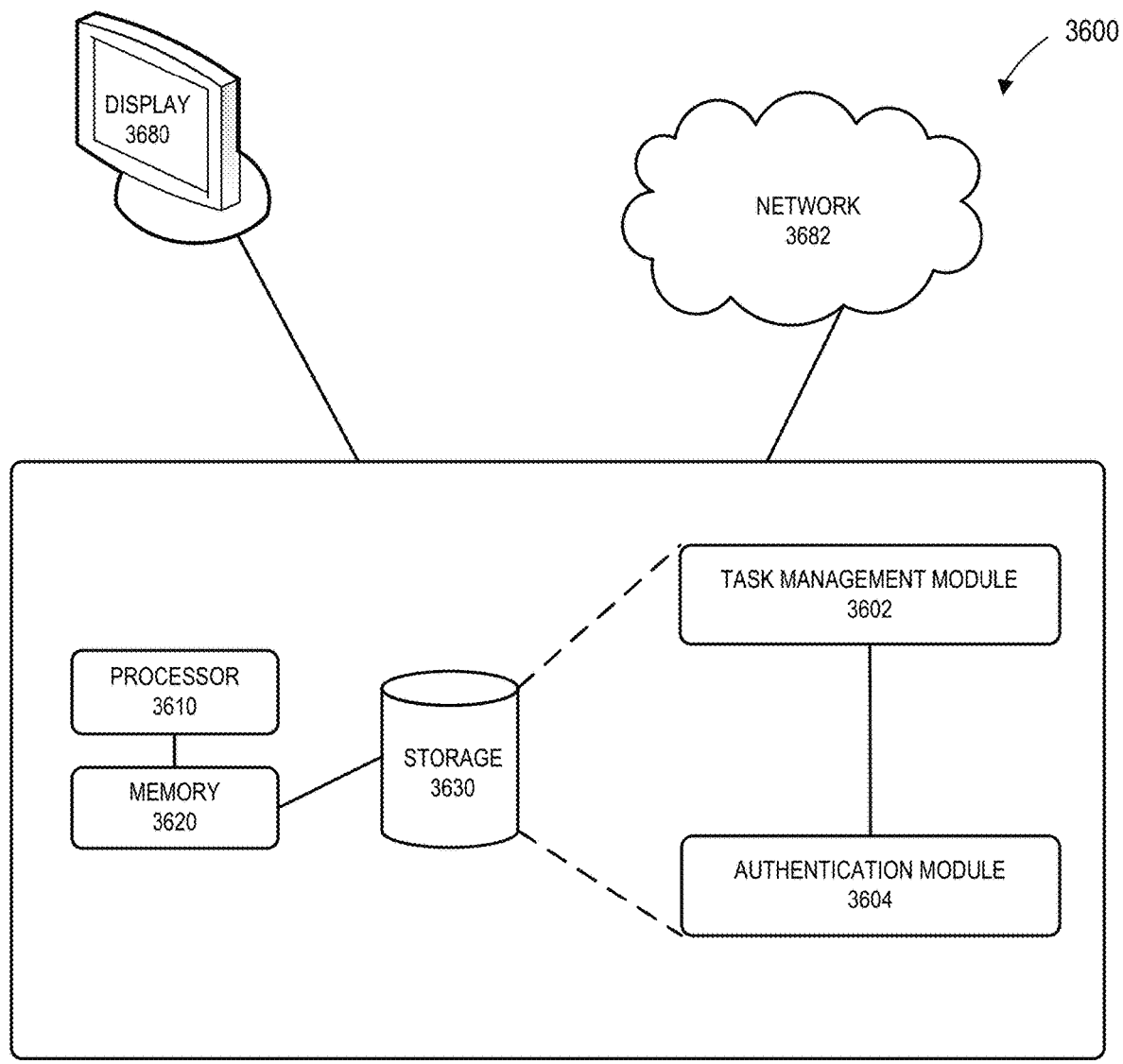
FIG. 36 presents a schematic diagram illustrating an exemplary server, in accordance with an embodiment of the present invention.

FIG. 36 presents a schematic diagram illustrating an exemplary server 3600 for task processing, in accordance with an embodiment of the present application. Server 3600 may include a processor 3610, a memory 3620, and a storage device 3630. Storage 3630 typically stores instructions that can be loaded into memory 3620 and executed by processor 3610 to perform the methods described above. In one embodiment, the instructions in storage 3630 can implement a task management module 3602 and an authentication module 3604 which can communicate with each other through various means.

In some embodiments, modules 3602-3604 can be partially or entirely implemented in hardware and can be part of processor 3610. Further, in some embodiments, the server may not include a separate processor and memory. Instead, in addition to performing their specific tasks, modules 3602-3604, either separately or in concert, may be part of special-purpose computation engines.

Storage 3630 stores programs to be executed by processor 3610. Specifically, storage 3630 stores a program that implements a server (e.g., application) for task processing. During operation, the application program can be loaded from storage 3630 into memory 3620 and executed by processor 3610. As a result, server 3600 can perform the functions described herein. Server 3600 can further include an optional display 3680, and can be coupled via one or more network interfaces to a network 3682.

Task management module 3602 may perform the functions of the server to manage tasks as described in this disclosure, including sending reminder instructions to task receiving devices.

Authentication module 3604 may authenticate users and their computing devices for instant messaging, task processing, and other functions.

Embodiments of the present invention may be implemented on various universal or dedicated computer system environments or configurations. For example, the computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module may include a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for processing tasks, comprising:
    receiving, by a task receiving device, a task event generated by a task sending device with a state of the task event being a to-be-accepted state, wherein the task event includes a task deadline configured by the task sending device;
    performing a first reminding operation associated with the task event for a user;
    upon receiving a predetermined user response, changing the state of the task event from the to-be-accepted state to an activated state, wherein the predetermined user response is responsive to the first reminding operation associated with the task event;
    obtaining one or more task deadlines of tasks events associated with a state which is the activated state;
    determining one or more expiration statuses of the task events based on the obtained task deadlines;
    displaying, on a display screen of the task receiving device for a user of the task receiving device, the task events based on the obtained task deadlines, by:
        highlighting, with a first visual indicator on the display screen, a first set of the task events with an expiration status of expired based on a current time and task deadlines for the first set of the task events; and
        highlighting, with a second visual indicator on the display screen, a second set of the task events with an expiration status of close-to-expiring, wherein an expiration status of close-to-expiring indicates that a deadline for a respective task event is within a predetermined threshold based on the current time;
    displaying, based on the state of the task event, related content of the task event using a corresponding display method;
    detecting user input for a communication message in a group chat window of an instant messaging application of the task sending device;
    detecting a user action associated with the communication message displayed in the group chat window, which generates a new task event based on the user action and a content of the communication message;
    configuring a new deadline for the new task event based on the user input received via the instant messaging application,
    wherein the new task event is displayed on the display screen based on the configured new deadline; and
    updating, on the display screen, the highlighting of the displayed task events, including the new task event, based on the current time, a current state of a respective task event, and a task deadline for the respective task event.

2. The method of claim 1, wherein when a reminder message is sent based on a predetermined reminder type configured using the task sending device, the first reminding operation is performed according to the predetermined reminder type.

3. The method of claim 2, wherein the task event includes a deadline configured using the task sending device, and the method further comprises:
    displaying in a plurality of different categories a plurality of reminder messages with task deadlines and a plurality of reminder messages without task deadlines.

4. The method of claim 1, further comprising:
    upon changing the state of the task event from the to-be-accepted state to the activated state, returning state change information to the task sending device, thereby informing a task sending party associated with the task sending device that the task event is accepted.

5. The method of claim 1, further comprising:
obtaining information indicating a predetermined reminder cycle for the task event, and performing at least one of:
performing a second reminding operation for the task event according to the predetermined reminding cycle before marking the task event as completed; and
responsive to receiving a reminding instruction, performing the second reminding operation associated with the task event, wherein the reminding instruction is sent according to the predetermined reminding cycle for the task event.

6. The method of claim 1, wherein the method further comprises:
receiving confirmation input from the user that the task event in the activated state has been completed;
sending to the task sending device a message indicating completion of the task event;
changing the state of the task event from the activated state to a to-be-confirmed state; and
changing the state of the task event from the to-be-confirmed state to a completed state upon receiving a message indicating approval of task completion sent by the task sending device.

7. The method of claim 1, further comprising:
upon receiving, from the task sending device, a message disapproving of a task completion, changing the state of the task event from a to-be-confirmed state to the activated state.

8. The method of claim 1, further comprising:
sending one of a message indicating that a task event has been completed, a message indicating approval of task completion, and a message indicating rejection of a completed task event as a reply message to a computing device associated with a task event, wherein a party associated with the task event may include at least one of: a task sending party, a sender of the message indicating that the task event has been completed, and other parties receiving messages relating to the task event.

9. The method of claim 1, further comprising:
receiving an instruction from the task sending device to close the activated task event; and
changing the state of the activated task event to a completed state.

10. The method of claim 1, further comprising:
marking each of the task events according to a respective expiration status; and
displaying each of the task events in a category according to the respective expiration status.

11. The method of claim 1, further comprising:
obtaining content included in a reminder message;
determining that the content includes a task deadline configured by a message sender;
determining that the reminder message containing the task deadline is a task-type reminder message; and
displaying the task-type reminder message in a category separate from non-task-type reminder messages, wherein the non-task-type reminder messages contain no task deadlines.

12. The method of claim 1, further comprising:
wherein a content of the new task event is the content of the communication message based on the detected user input;
generating a reminder message that includes the content of the new task event and the new deadline as task event information; and
sending the reminder message to a task receiving device.

13. The method of claim 12, wherein the reminder message includes a corresponding predetermined reminder type, and the corresponding predetermined reminder type indicates how a reminder operation is to be performed.

14. The method of claim 1, further comprising:
generating a new task event based on user-configured task content and a deadline configured by a user;
generating a reminder message that includes the new task event;
determining a reminder type for the reminder message based on user input selecting the reminder type; and
using the selected reminder type to send the reminder message to at least one task receiving device, thereby performing a reminder operation for the task receiving device and allowing the task receiving device to obtain task information.

15. The method of claim 1, further comprising:
responsive to receiving user input instructing to close the task event, sending an instruction to close the task event to at least one task receiving device.

16. The method of claim 1, further comprising:
responsive to receiving an instruction from the task sending device to close the task event, authenticating a source of the instruction; and
upon successfully authenticating the source of the instruction, automatically changing the state of the task event to completed.

17. The method of claim 1, further comprising:
displaying, on a first portion of the display screen of the task receiving device using a distinguishing indicator, the first set of the task events with an expiration status of expired and the second set of the tasks events with an expiration status of close-to-expiring;
displaying, on a second portion of the display screen of the task receiving device, a third set of task events with an expiration status of other-not-expired, wherein an expiration of status of other-not-expired indicates that a deadline for a respective task event is not within the predetermined threshold; and
highlighting, on the display screen of the task receiving device for the user of the task receiving device, an urgency of the first and second set of task events relative to the third set of task events based on the distinguishing indicator.

18. A computing system comprising:
one or more processors; and
a non-transitory computer-readable medium coupled to the one or more processors storing instructions stored that, when executed by the one or more processors, cause the computing system to perform a method for processing tasks, the method comprising:
receiving, by a task receiving device, a task event generated by a task sending device with a state of the task event being a to-be-accepted state, wherein the task event includes a task deadline configured by the task sending device;
performing a first reminding operation associated with the task event for a user;
upon receiving a predetermined user response, changing the state of the task event from the to-be-accepted state to an activated state, wherein the predetermined user response is responsive to the first reminding operation associated with the task event;

obtaining one or more task deadlines of tasks events associated with a state which is the activated state;

determining one or more expiration statuses of the task events based on the obtained task deadlines;

displaying, on a display screen of the task receiving device for a user of the task receiving device, the task events based on the obtained task deadlines, by;

highlighting, with a first visual indicator on the display screen, a first set of the task events with an expiration status of expired based on a current time and task deadlines for the first set of the task events; and highlighting, with a second visual indicator on the display screen, a second set of the task events with an expiration status of close-to-expiring, wherein an expiration status of close-to-expiring indicates that a deadline for a respective task event is within a predetermined threshold based on the current time;

displaying, based on the state of the task event, related content of the task event using a corresponding display method;

detecting user input for a communication message in a group chat window of an instant messaging application of the task sending device;

detecting a user action associated with the communication message displayed in the group chat window, which generates a new task event based on the user action and a content of the communication message;

configuring a new deadline for the new task event based on the user input received via the instant messaging application, wherein the new task event is displayed on the display screen based on the configured new deadline; and updating, on the display screen, the highlighting of the displayed task events, including the new task event, based on the current time, a current state of a respective task event, and a task deadline for the respective task event.

19. A non-transitory computer-readable storage medium storing instructions that when executed by a computer cause the computer to perform a method for processing tasks, the method comprising:

receiving, by a task receiving device, a task event generated by a task sending device with a state of the task event being a to-be-accepted state, wherein the task event includes a task deadline configured by the task sending device;

performing a first reminding operation associated with the task event for a user;

upon receiving a predetermined user response, changing the state of the task event from the to-be-accepted state to an activated state, wherein the predetermined user response is responsive to the first reminding operation associated with the task event;

obtaining one or more task deadlines of tasks events associated with a state which is the activated state;

determining one or more expiration statuses of the task events based on the obtained task deadlines;

displaying, on a display screen of the task receiving device for a user of the task receiving device, the task events based on the obtained task deadlines, by;

highlighting, with a first visual indicator on the display screen, a first set of the task events with an expiration status of expired based on a current time and task deadlines for the first set of the task events; and highlighting, with a second visual indicator on the display screen, a second set of the task events with an expiration status of close-to-expiring, wherein an expiration status of close-to-expiring indicates that a deadline for a respective task event is within a predetermined threshold, based on the current time;

displaying, based on the state of the task event, related content of the task event using a corresponding display method;

detecting user input for a communication message in a group chat window of an instant messaging application of the task sending device;

detecting a user action associated with the communication message displayed in the group chat window, which generates a new task event based on the user action and a content of the communication message;

configuring a new deadline for the new task event based on the user input received via the instant messaging application, wherein the new task event is displayed on the display screen based on the configured new deadline; and updating, on the display screen, the highlighting of the displayed task events, including the new task event, based on the current time, a current state of a respective task event, and a task deadline for the respective task event.

20. The computing system of claim 18, wherein the method further comprises:

obtaining content included in a reminder message;

determining that the content includes a task deadline configured by a message sender;

determining that the reminder message containing the task deadline is a task-type reminder message; and displaying the task-type reminder message in a category separate from non-task-type reminder messages, wherein the non-task-type reminder messages contain no task deadlines.

* * * * *